(12) United States Patent
Furuyama et al.

(10) Patent No.: US 9,013,628 B2
(45) Date of Patent: Apr. 21, 2015

(54) LENS BARREL AND IMAGE PICKUP APPARATUS

(71) Applicant: Sony Corporation, Tokyo (JP)

(72) Inventors: Kiyomitsu Furuyama, Kanagawa (JP);
Takashi Terai, Kanagawa (JP); Toshiaki Edamitsu, Ibaraki (JP); Naoko Matsubara, Chiba (JP)

(73) Assignee: Sony Corporation, Tokyo (JP)

( * ) Notice: Subject to any disclaimer, the term of this patent is extended or adjusted under 35 U.S.C. 154(b) by 24 days.

(21) Appl. No.: 13/888,633

(22) Filed: May 7, 2013

(65) Prior Publication Data
US 2013/0335623 A1 Dec. 19, 2013

(30) Foreign Application Priority Data

Jun. 14, 2012 (JP) .................................. 2012-134775

(51) Int. Cl.
*H04N 5/225* (2006.01)
*H04N 5/232* (2006.01)
*G02B 7/02* (2006.01)
*G02B 7/14* (2006.01)
*G03B 17/14* (2006.01)

(52) U.S. Cl.
CPC .............. *G02B 7/023* (2013.01); *H04N 5/2254* (2013.01); *G02B 7/14* (2013.01); *G03B 17/14* (2013.01)

(58) Field of Classification Search
CPC .................................................... H04N 5/2254
USPC ............................ 348/207.99, 345, 373–374
See application file for complete search history.

(56) References Cited

U.S. PATENT DOCUMENTS

| 6,204,979 B1 * | 3/2001 | Matsui ......................... 359/819 |
| 8,411,372 B2 * | 4/2013 | Kudoh .......................... 359/700 |
| 2004/0095657 A1 * | 5/2004 | Takanashi et al. ............. 359/822 |
| 2007/0195430 A1 | 8/2007 | Koyama |

FOREIGN PATENT DOCUMENTS

JP 2007-219405 A 8/2007

* cited by examiner

*Primary Examiner* — Ahmed A Berhan
(74) *Attorney, Agent, or Firm* — Rader, Fishman & Grauer PLLC

(57) ABSTRACT

A lens barrel includes: a lens holding frame holding a lens; a mounting member to which the lens holding frame is mounted; an inclination regulating member regulating a position of the lens holding frame with respect to the mounting member, thereby regulating inclination of the lens holding frame with respect to an optical axis; and an eccentricity regulating member regulating the position of the lens holding frame with respect to said mounting member, thereby regulating eccentricity of the lens holding frame with respect to the optical axis, in which the eccentricity regulating member is supported by said inclination regulating member.

22 Claims, 16 Drawing Sheets

LENS BARREL AND IMAGE PICKUP APPARATUS

BACKGROUND

The present disclosure relates to a lens barrel and an image pickup apparatus including the same. More particularly, the present disclosure relates to a lens barrel in which miniaturization and facilitation of a regulating work can be realized in such a way that an eccentricity regulating member for regulating eccentricity of a lens holding frame with respect to an optical axis is supported by an inclination regulating member for regulating inclination of the lens holding frame with respect to the optical axis.

Various kinds of image pickup apparatuses such as a still camera include first type one in which a lens barrel in which various kinds of optical parts and optical elements such as lenses are disposed is built in an apparatus main body, second type one in which an interchangeable lens functioning as a lens barrel is made detachable for an apparatus main body, third type one, that is, so-called retractable type one in which a lens barrel is extensively provided, and the like.

In an optical system in a lens barrel of such an image pickup apparatus, in recent years, merely simply assembling the lenses (lens group) result in that it has been very difficult to ensure the excellent optical performance.

In order to cope with such a situation, after the whole of or a part of the lens barrel has been assembled, a part of the lenses (lens group) disposed inside the lens barrel is inclined, and a regulating mechanism which is capable of eccentrically moving the lenses (lens group) is provided. Thus, there is carried out the optical regulation (inclination regulation and eccentricity regulation) for ensuring the excellent image quality.

In addition, after such optical regulation has been carried out, for the purpose of preventing the optical performance from being changed after completion of the regulation, a lens holding frame for holding the lenses for which the regulation has been carried out is fixed to a mounting member such as a guide tube or a movement ring by, for example, using an ultraviolet cure adhesive agent or the like.

An existing image pickup apparatus in which the optical regulation as described above for the lenses (lens group) is carried out includes an example as will be described below (refer to FIG. 2 of Japanese Patent Laid-Open No. 2007-219405 (Patent Document 1), for example).

In an image pickup apparatus described in Patent Document 1, a five-group holding plate provided with a regulating mechanism is fixed to a head portion of an extension portion of a three-group holding frame. Also, a five-group holding frame for holding a fifth lens group is held in the three-group holding frame through the five-group holding plate by both of a first regulating member and a second regulating member.

The first regulating member is an eccentric member, and thus regulation for eccentricity of the fifth lens group with respect to an optical axis can be carried out by regulating a rotational direction of the eccentric member. In addition, the second regulating member is also an eccentric member, and thus regulation for inclination of the fifth lens group with respect to the optical axis can be carried out by regulating the rotational direction of the eccentric member.

SUMMARY

However, in the image pickup apparatus described in Patent Document 1, the first regulating portion for carrying out the eccentricity regulation, and the second regulating portion for carrying out the inclination regulation are independently disposed in positions which are made away from each other in a circumference direction on an outer circumference side of the five-group holding frame.

Therefore, there are required the different spaces in which the first regulating member and the second regulating member are disposed, respectively. As a result, the regulating mechanism occupies a large space in the circumference direction, which becomes a factor impeding the miniaturization.

In addition, there is also caused a problem that the regulating work is complicated all the more because the first regulating member and the second regulating member need to be regulated in the different positions, respectively, in the circumference direction.

The present disclosure has been made in order to solve the problems described above, and it is therefore desirable to provide a lens barrel for which miniaturization, and facilitation of a regulating work can be both realized, and an image pickup apparatus including the same.

In order to attain the desire described above, firstly, according to an embodiment of the present disclosure, there is provided a lens barrel including: a lens holding frame holding a lens; a mounting member to which the lens holding frame is mounted; an inclination regulating member regulating a position of the lens holding frame with respect to the mounting member, thereby regulating inclination of the lens holding frame with respect to an optical axis; and an eccentricity regulating member regulating the position of the lens holding frame with respect to the mounting member, thereby regulating eccentricity of the lens holding frame with respect to the optical axis, in which the eccentricity regulating member is supported by the inclination regulating member.

Therefore, in the lens barrel according to the embodiment of the present disclosure, both of the inclination regulating member and the eccentricity regulating member are disposed in the same space.

Secondly, in the lens barrel according to the embodiment of the present disclosure, preferably, the inclination regulating member may be rotatably supported by the mounting member with an axis extending in a radiation direction perpendicular to the optical axis as a fulcrum; and the eccentricity regulating member may be rotatably supported by the inclination regulating member with the axis extending in the radiation direction perpendicular to the optical axis as the fulcrum.

The inclination regulating member is rotatably supported by the mounting member with the axis extending in the radiation direction perpendicular to the optical axis as the fulcrum, and the eccentricity regulating member is rotatably supported by the inclination regulating member with the axis extending in the radiation direction perpendicular to the optical axis as the fulcrum, whereby both of the inclination regulating member and the eccentricity regulating member are rotated, thereby carrying out the regulation for the inclination of the lens holding frame with respect to the optical axis, and the regulation for the eccentricity of the lens holding frame with respect to the optical axis.

Thirdly, in the lens barrel according to the embodiment of the present disclosure, preferably, the inclination regulating member may come in contact with the lens holding frame in the optical axis direction; and inclination of the lens holding frame with respect to the mounting member may be changed by rotation of the inclination regulating member with respect to the mounting member, thereby regulating the inclination of the lens holding frame.

The inclination regulating member comes in contact with the lens holding frame in the optical axis direction, and the inclination of the lens holding frame with respect to the mounting member is changed by the rotation of the inclination regulating member with respect to the mounting member, thereby regulating the inclination of the lens holding frame, whereby the inclination of the lens holding frame is regulated by the rotation of the inclination regulating member with respect to the mounting member.

Fourthly, in the lens barrel according to the embodiment of the present disclosure, preferably, the eccentricity regulating member may come in contact with the lens holding frame in a radiation direction; and a position of the lens holding frame with respect to the mounting member may be changed by rotation of the eccentricity regulating member with respect to the inclination regulating member, thereby regulating the eccentricity of the lens holding frame.

The eccentricity regulating member comes in contact with the lens holding frame in a radiation direction, and the position of the lens holding frame with respect to the mounting member is changed by the rotation of the eccentricity regulating member with respect to the inclination regulating member, thereby regulating the eccentricity of the lens holding frame, whereby the eccentricity of the lens holding frame is regulated by the rotation of the eccentricity regulating member with respect to the inclination regulating member.

Fifthly, in the lens barrel according to the embodiment of the present disclosure, preferably, a screw portion may be formed in the eccentricity regulating member; and a screw groove portion into which the screw portion is screwed may be formed in the inclination regulating member.

The screw portion is formed in the eccentricity regulating member, and the screw groove portion into which the screw portion is screwed is formed in the inclination regulating member, whereby it is possible to carry out the fine regulation.

Sixthly, in the lens barrel according to the embodiment of the present disclosure, preferably, a biasing spring pressing the lens holding frame against the inclination regulating member in the optical axis direction may be provided.

The biasing spring pressing the lens holding frame against the inclination regulating member in the optical axis direction is provided, whereby backlash of the lens holding frame with respect to both of the inclination regulating member and the eccentricity regulating member is prevented from being generated.

Seventhly, in the lens barrel according to the embodiment of the present disclosure, preferably, a spring member pressing the lens holding frame against the eccentricity regulating member in the radiation direction may be provided.

The spring member pressing the lens holding frame against the eccentricity regulating member in the radiation direction is provided, whereby the backlash of the lens holding frame with respect to the eccentricity regulating member is prevented from being generated.

Eighthly, in the lens barrel according to the embodiment of the present disclosure, preferably, the plural inclination regulating members and the plural eccentricity regulating members may be provided so as to be made away from each other in a circumference direction.

The plural inclination regulating members and the plural eccentricity regulating members are provided so as to be made away from each other in the circumference direction, whereby plural regulation positions are obtained.

Ninthly, in the lens barrel according to the embodiment of the present disclosure, preferably, an operated portion with which the inclination regulating member comes in contact with the lens holding frame in the optical axis direction may be provided; and the inclination regulating member may come in point-contact with the operated portion.

The operated portion with which the inclination regulating member comes in contact with the lens holding frame in the optical axis direction is provided, and the inclination regulating member comes in point-contact with the operated portion, whereby a contact position of the lens holding frame for the inclination regulating member is easy to determine.

Tenthly, in the lens barrel according to the embodiment of the present disclosure, preferably, a holding member holding the lens holding frame in the mounting member in a phase of the regulation by the inclination regulating member and the eccentricity regulating member may be provided.

The holding member holding the lens holding frame in the mounting member in a phase of the regulation by the inclination regulating member and the eccentricity regulating member is provided, whereby the regulation is carried out in a state in which the lens holding frame is held in the mounting member by the holding member.

Eleventhly, in the lens barrel according to the embodiment of the present disclosure, preferably, a coupling hole may be formed in the lens holding frame; an abutment portion which is inserted into the coupling hole to abut against a wall surface forming the coupling hole may be provided in the holding member; and the abutment portion may come in point-contact with the wall surface.

The coupling hole is formed in the lens holding frame, the abutment portion which is inserted into the coupling hole to abut against the wall surface forming the coupling hole is provided in the holding member, and the abutment portion comes in point-contact with the wall surface, whereby a contact position of the lens holding frame for the holding member is easy to determine.

Twelfthly, in the lens barrel according to the embodiment of the present disclosure, preferably, the regulation for the inclination of the lens holding frame with respect to the optical axis, and the regulation for the eccentricity of the lens holding frame with respect to the optical axis may be carried out in a telephoto end state.

The regulation for the inclination of the lens holding frame with respect to the optical axis, and the regulation for the eccentricity of the lens holding frame with respect to the optical axis are carried out in the telephoto end state, whereby the regulation is carried out in a state in which sensitivity of the optical system is highest in a variable power area.

Thirteenthly, according to another embodiment of the present disclosure, there is provided an image pickup apparatus including: a lens barrel in an inside of which an optical system is disposed; and an image pickup element converting an optical image captured through the optical system into an electrical signal, in which the lens barrel includes: a lens holding frame holding a lens; a mounting member to which the lens holding frame is mounted; an inclination regulating member regulating a position of the lens holding frame with respect to the mounting member, thereby regulating inclination of the lens holding frame with respect to an optical axis; and an eccentricity regulating member regulating the position of the lens holding frame with respect to the mounting member, thereby regulating eccentricity of the lens holding frame with respect to the optical axis, and the eccentricity regulating member is supported by the inclination regulating member.

Therefore, in the image pickup apparatus according to another embodiment described above of the present disclosure, in the lens barrel, both of the inclination regulating member and the eccentricity regulating member are disposed in the same space.

Firstly, the lens barrel according to the embodiment described above of the present disclosure includes the lens holding frame holding a lens, the mounting member to which the lens holding frame is mounted, the inclination regulating member regulating the position of the lens holding frame with respect to the mounting member, thereby regulating the inclination of the lens holding frame with respect to the optical axis, and the eccentricity regulating member regulating the position of the lens holding frame with respect to the mounting member, thereby regulating the eccentricity of the lens holding frame with respect to the optical axis, in which the eccentricity regulating member is supported by the inclination regulating member.

Therefore, both of the inclination regulating member and the eccentricity regulating member are disposed in the same space, and the regulation for the inclination of the lens holding frame with respect to the optical axis, and the eccentricity of the lens holding frame with respect to the optical axis can be carried out in the same position. As a result, it is possible to realize the miniaturization, and the facilitation of the work.

Secondly, the inclination regulating member is rotatably supported by the mounting member with the axis extending in the radiation direction perpendicular to the optical axis as the fulcrum, and the eccentricity regulating member is rotatably supported by the inclination regulating member with the axis extending in the radiation direction perpendicular to the optical axis as the fulcrum.

Therefore, both of the inclination regulating member and the eccentricity regulating member are rotated, whereby it is possible to carry out the regulation for the inclination of the lens holding frame with respect to the optical axis, and the regulation for the eccentricity of the lens holding frame with respect to the optical axis. As a result, it is possible to realize the facilitation of the regulation with the simple structure.

Thirdly, the inclination regulating member comes in contact with the lens holding frame in the optical axis direction, and the inclination of the lens holding frame with respect to the mounting member is changed by the rotation of the inclination regulating member with respect to the mounting member, thereby regulating the inclination of the lens holding frame.

Therefore, the inclination of the lens holding frame is regulated by the rotation of the inclination regulating member with respect to the mounting member. As a result, it is possible to readily carry out the regulation by the regulating mechanism having the simple structure.

Fourthly, the eccentricity regulating member comes in contact with the lens holding frame in the radiation direction, and the position of the lens holding frame with respect to the mounting member is changed by rotation of the eccentricity regulating member with respect to the inclination regulating member, thereby regulating the eccentricity of the lens holding frame.

Therefore, the eccentricity of the lens holding frame is regulated by the rotation of the eccentricity regulating member with respect to the mounting member. As a result, it is possible to readily carry out the regulation by the regulating mechanism having the simple structure.

Fifthly, the screw portion is formed in the eccentricity regulating member, and the screw groove portion into which the screw portion is screwed is formed in the inclination regulating member.

Therefore, it becomes possible to carry out the fine regulation. As a result, it is possible to enhance the regulation precision.

Sixthly, the biasing spring pressing the lens holding frame against the inclination regulating member in the optical axis direction is provided.

Therefore, the backlash of the lens holding frame with respect to both of the inclination regulating member and the eccentricity regulating member is prevented from being generated. As a result, it is possible to enhance the regulation precision for the inclination with respect to the optical axis.

Seventhly, the spring member pressing the lens holding frame against the eccentricity regulating member in the radiation direction is provided.

Therefore, the backlash of the lens holding frame with respect to the eccentricity regulating member is prevented from being generated. As a result, it is possible to enhance the regulation precision for the eccentricity with respect to the optical axis.

Eighthly, the plural inclination regulating members and the plural eccentricity regulating members are provided so as to be made away from each other in a circumference direction.

Therefore, since the plural regulation positions are obtained, it is possible to ensure the high regulation precision.

Ninthly, the operated portion with which the inclination regulating member comes in contact with the lens holding frame in the optical axis direction is provided, and the inclination regulating member comes in point-contact with the operated portion.

Therefore, the contact position of the lens holding frame for the inclination regulating member is easy to determined, and thus it is possible to further enhance the regulation precision.

Tenthly, the holding member holding the lens holding frame in the mounting member in a phase of the regulation by the inclination regulating member and the eccentricity regulating member is provided.

Therefore, the regulation is carried out in a state in which the lens holding frame is held in the mounting member by the holding member. As a result, it is possible to precisely and speedily carry out the regulation for the lens holding frame.

Eleventhly, the coupling hole is formed in the lens holding frame, the abutment portion which is inserted into the coupling hole to abut against a wall surface forming the coupling hole is provided in the holding member, and the abutment portion comes in point-contact with the wall surface.

Therefore, the contact position of the lens holding frame for the holding member is easy to determine. As a result, it is possible to further enhance the regulation precision.

Twelfthly, the regulation for the inclination of the lens holding frame with respect to the optical axis, and the regulation for the eccentricity of the lens holding frame with respect to the optical axis are carried out in a telephoto end state.

Therefore, the regulation is carried out in a state in which sensitivity of the optical system is highest in a variable power area. As a result, it is possible to enhance the regulation precision.

Thirteenthly, the image pickup apparatus according to another embodiment described above of the present disclosure includes the lens barrel in the inside of which the optical system is disposed, and the image pickup element converting an optical image captured through the optical system into the electrical signal. In the apparatus, the lens barrel includes the lens holding frame holding the lens, the mounting member to which the lens holding frame is mounted, the inclination regulating member regulating the position of the lens holding frame with respect to the mounting member, thereby regulating the inclination of the lens holding frame with respect to the optical axis, and the eccentricity regulating member regulating the position of the lens holding frame with respect to the mounting member, thereby regulating the eccentricity of the lens holding frame with respect to the optical axis, and the eccentricity regulating member is supported by the inclination regulating member.

Therefore, both of the inclination regulating member and the eccentricity regulating member are disposed in the same space, and the regulation for the inclination of the lens holding frame with respect to the optical axis, and the eccentricity of the lens holding frame with respect to the optical axis can be carried out in the same position. As a result, it is possible to realize the miniaturization, and the facilitation of the work.

BRIEF DESCRIPTION OF THE DRAWINGS

FIG. 8 is a schematic enlarged cross sectional view showing a regulating mechanism, and the like;

FIG. 12 is an enlarged perspective view showing the movable side regulating portion, and the like;

FIG. 13 is an enlarged perspective view showing the reception side regulating portion, and the like;

FIG. 14 is an enlarged top plan view showing the reception side regulating portion, and the like;

DETAILED DESCRIPTION OF THE PREFERRED EMBODIMENTS

Hereinafter, embodiments of the present disclosure will be described in detail with reference to the accompanying drawings.

In the embodiments of the present disclosure, an image pickup apparatus of the present disclosure is applied to a still camera, and a lens barrel of the present disclosure is applied to a lens barrel which is provided as an interchangeable lens of the still camera.

It is noted that the scope of application of the present disclosure is by no means limited to the still camera, and the lens barrel provided as the interchangeable lens of the still camera, and thus can be generally applied to a video camera and various kinds of image pickup apparatuses incorporated in other apparatuses, and various kinds of lens barrels provided in these image pickup apparatuses.

In addition, the lens barrel is by no means limited to the interchangeable lens, and thus can be generally applied to retractable type one which is telescopically provided, and such type one as to be disposed inside the image pickup apparatus. In the case of the image pickup apparatus as well, the image pickup apparatus can be generally applied not only to such retractable type one in which the lens barrel is telescopically provided, but also to such type one as to have the lens barrel provided in the inside thereof.

In the following description, it is supposed that front-back, vertical, and horizontal directions are represented with respect to a direction which is viewed from a photographer in a phase of photographing by the still camera. Therefore, a subject side is defined as the front, and the photographer side is defined as the back.

It is noted that the front-back, vertical, and horizontal directions which will be shown below are defined for the sake of convenience of the description, and thus when the present disclosure is embodied, the directions are by no means limited to those direction.

[Structure of Image Pickup Apparatus]

Figure 1:
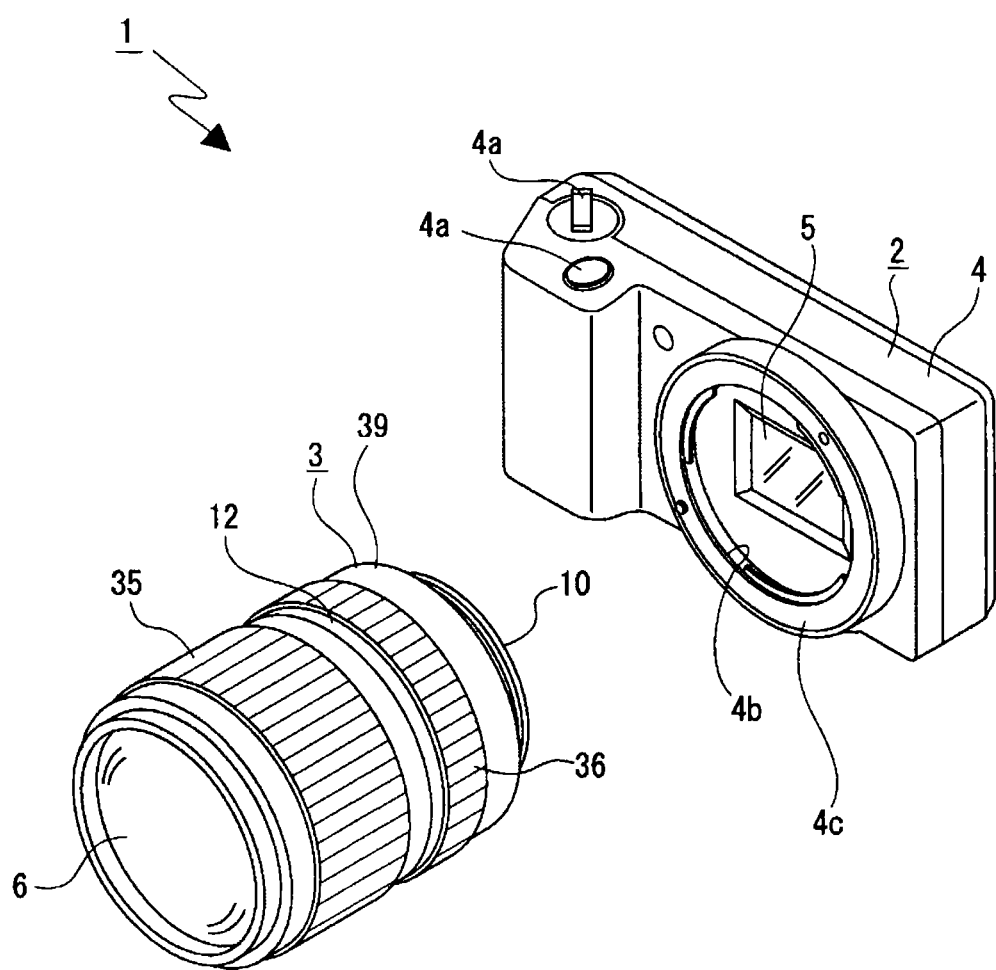
FIG. 1 is a schematic perspective view of an image pickup apparatus according to a first embodiment of the present disclosure.

As shown in FIG. 1, an image pickup apparatus (still camera) 1 according to a first embodiment of the present disclosure is composed of an apparatus main body 2 and a lens barrel (interchangeable lens) 3. It is noted that in such type image pickup apparatus that the lens barrel is incorporated inside the apparatus main body 2, or a retractable type image pickup apparatus, the image pickup apparatus is composed of only the apparatus main body including the lens barrel provided therein.

In the apparatus main body 2, individual necessary portions are disposed inside and outside a chassis 4.

Various kinds of input manipulation portions 4a, 4a, . . . are disposed on an upper surface of the chassis 4. With regard to the input manipulation portions 4a, 4a, for example, a power source button, a shutter button, a mode switching knob, and the like are provided.

Various kinds of input manipulation portions, and a display portion (both not shown) are disposed on a back surface of the chassis 4. With regard to the input manipulation portions, for example, a zoom switch, a mode switching knob, and the like are provided.

A circular opening 4b is formed in a front surface of the chassis 4, and a circumference portion of the opening 4b is provided as a mount portion 4c to which the lens barrel 3 is to be mounted.

An image pickup element 5 such as a Charge Coupled Device (CCD) or a Complementary Metal-Oxide Semiconductor (CMOS) is disposed inside the chassis 4, and the image pickup element 5 is located in the rear of the opening 4b.

[Structure of Lens Barrel]

Hereinafter, the lens barrel 3 according to a second embodiment of the present disclosure will be described in detail with reference to FIGS. 2 to 15. As can be seen from the foregoing, the entire structure and operation of the lens barrel 3 is included in a still camera as the image pickup apparatus 1 according to the first embodiment of the present disclosure.

The lens barrel 3, for example, is an interchangeable lens for a digital single-lens reflex camera.

Figure 2:
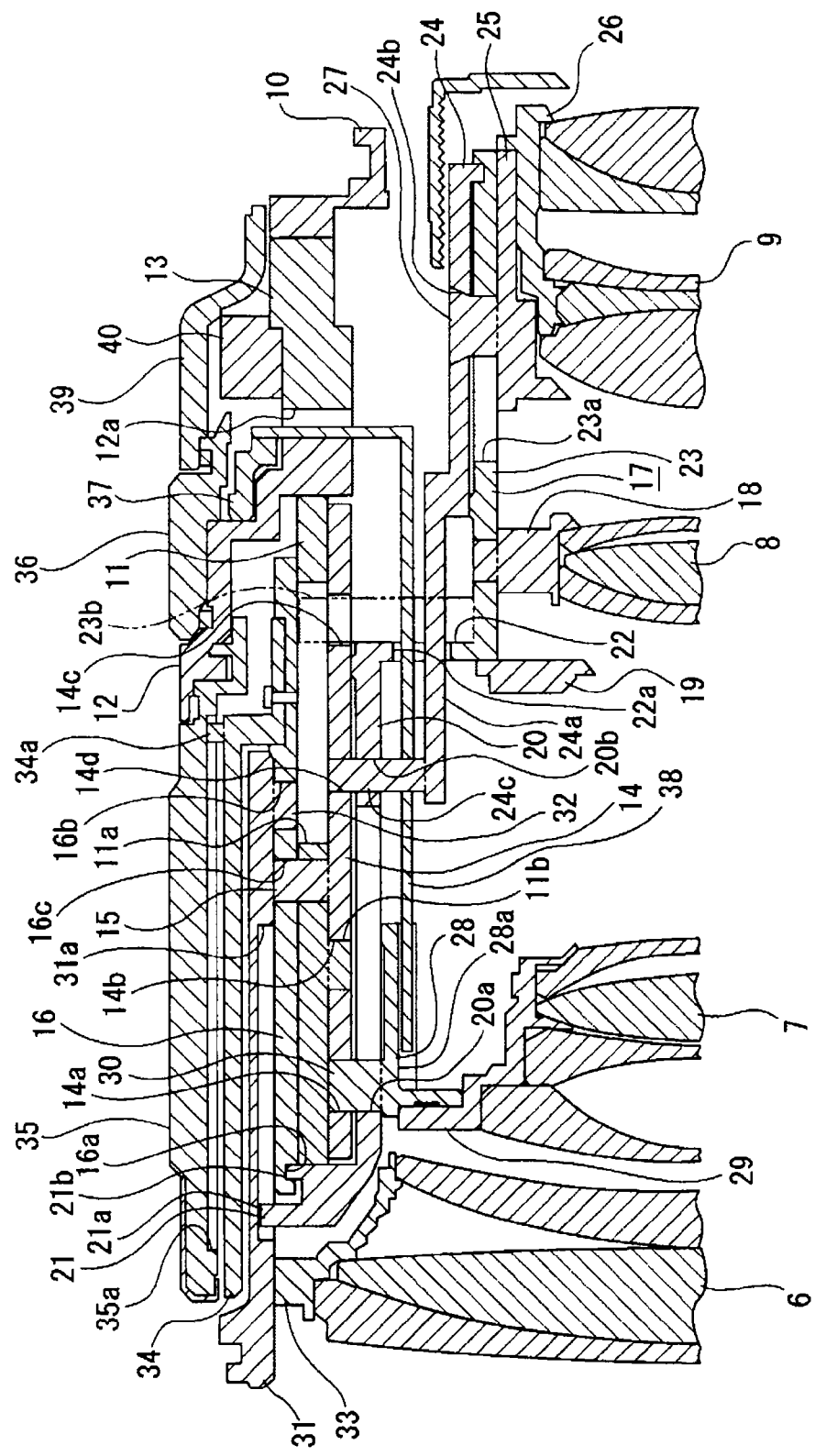
FIG. 2 is a schematic enlarged cross sectional view showing a part of an internal structure of a lens barrel according to a second embodiment of the present disclosure.

The lens barrel 3, for example, has a zoom optical system which has a four-group structure, and which is provided as a varifocal lens. Thus, as shown in FIG. 2, the lens barrel 3 has a first lens group 6, a second lens group 7, a third lens group 8, and a fourth lens group 9 which are disposed in order from the subject side (front side) to the image side (back side). In the lens barrel 3, the first lens group 6, the second lens group 7, the third lens group 8, and the fourth lens group 9 are moved to suitable positions, respectively, in an optical axis direction, thereby carrying out the zooming. In addition, the second lens group 7 is moved in the optical axis direction, thereby carrying out the focusing.

A lens mount 10 which is bayonet-coupled to the mount portion 4c of the apparatus main body 2 is provided in a back end portion of the lens barrel 3.

A fixed ring 11, an intermediate tube 12, and a back portion holding ring 13 each of which is formed approximately in a cylindrical shape are disposed in order in the lens barrel 3 from the front side.

A three-group straight guide groove 11a which extends in the front-back direction is formed in the fixed ring 11. Also, fixed rollers 11b, 11b, 11b are mounted to the fixed ring 11 so as to be made away from one another in the circumference direction.

The intermediate tube 12 is located on an outer circumference side in a back end portion of the fixed ring 11 except for a back end portion thereof. Also, a back end portion of the intermediate tube 12 is fixed to the back end portion of the fixed ring 11. An insertion hole 12a is formed in the back end portion of the intermediate tube 12.

A front surface of the back portion holding ring 13 is fixed to a back surface of the intermediate tube 12. The lens mount 10 is fixed to a back end portion of the back portion holding ring 13.

The lens mount 10, fixed ring 11, intermediate tube 12, and back portion holding ring 13 described above function as an integral fixed portion, and are a base portion in the lens barrel 3.

Figure 3:
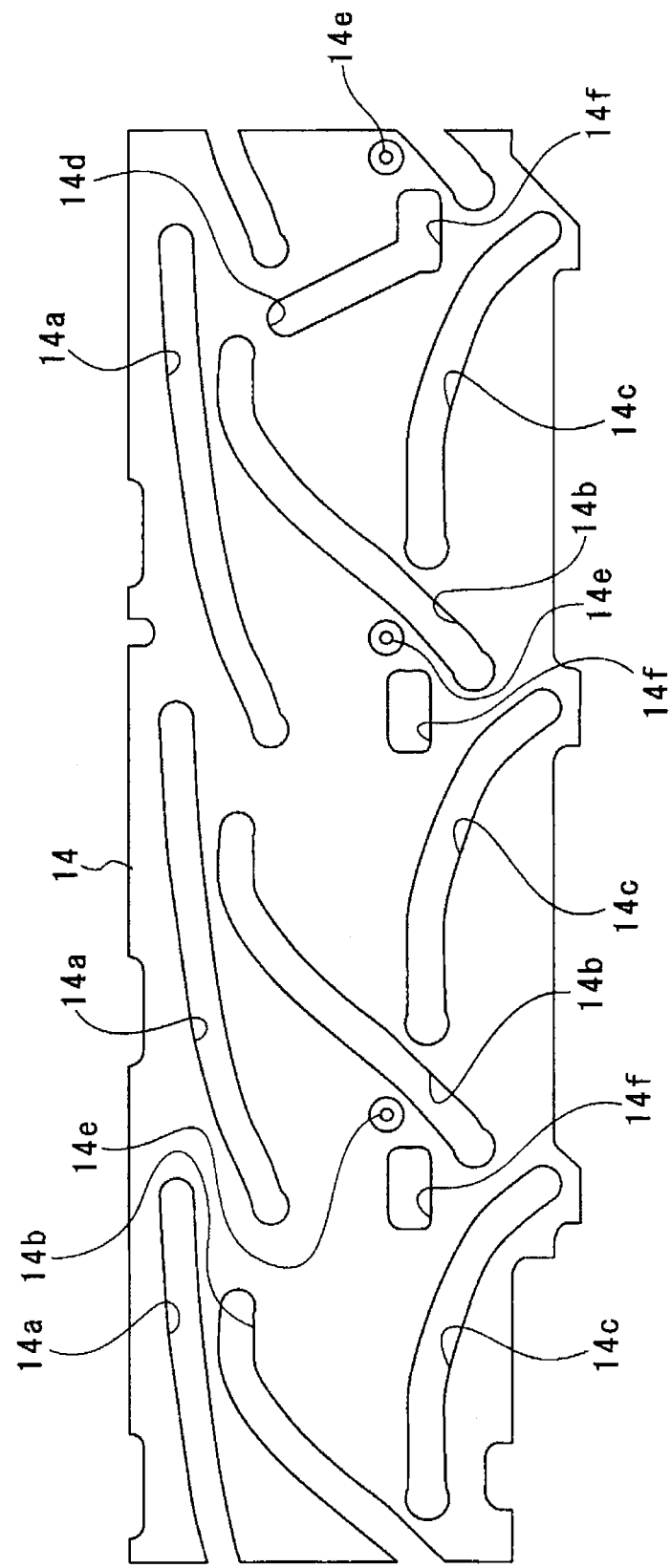
FIG. 3 is an enlarged exploded view of a zoom focus cum ring.

A zoom focus cum ring 14 is disposed on an inner surface side of the fixed ring 11. As shown in FIGS. 2 and 3, two-group focus cum grooves 14a, 14a, 14a, cum grooves 14b, 14b, 14b for movement, and three-group cum grooves 14c, 14c, 14c are formed in the zoom focus cum ring 14 so as to be made away from one another in the circumference direction. An interlocking cum groove (cum hole) 14d is formed in the zoom focus cum ring 14. The interlocking cum groove 14d is inclined with respect to the optical axis direction.

Fixed rollers 11b, 11b, 11b of the fixed ring 11 are slidably engaged with cum grooves 14b, 14b, 14b for movement.

Coupling roller mounting portions 14e, 14e, 14e are provided in the zoom focus cum ring 14 so as to be made away from one another in the circumference direction, respectively. Coupling rollers 15, 15, 15 are mounted to the coupling roller mounting portions 14e, 14e, 14e, respectively.

Work holes 14f, 14f, 14f are formed in the zoom focus cum ring 14 so as to be made away from one another at equal intervals in the circumference direction. Each of the work holes 14f, 14f, 14f is made larger in a width thereof in the circumference direction than that in the optical axis direction (in the front-back direction).

Of the work holes 14f, 14f, 14f, for example, one work hole 14f is formed so as to be connected to the interlocking cum groove 14d.

Of the work holes 14f, 14f, 14f, for example, one work hole 14f is formed so as to be connected to the interlocking cum groove 14d in such a manner, whereby an area of a hole formed in the zoom focus cum ring 14 becomes small. As a result, it is possible to suppress the reduction of the strength of the zoom focus cum ring 14.

Figure 4:
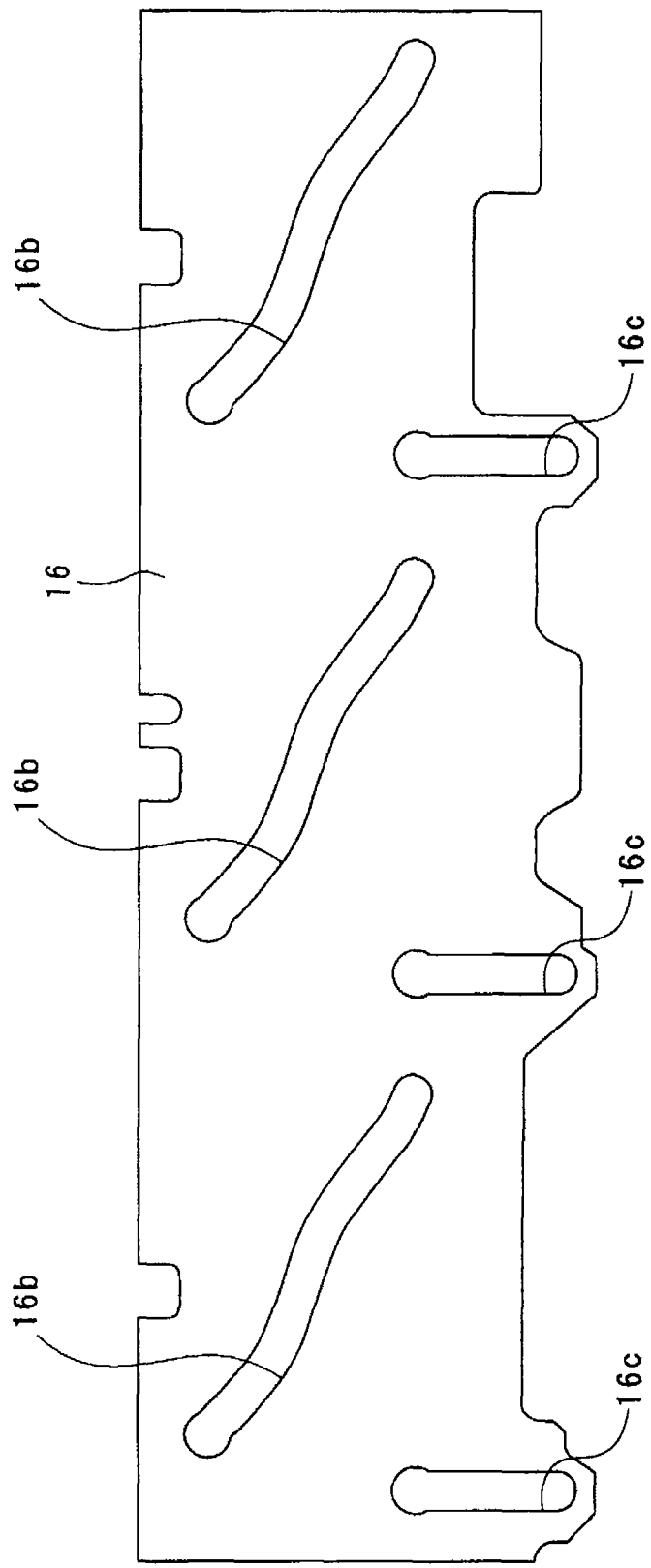
FIG. 4 is an enlarged exploded view of a one-group cum ring.

As shown in FIGS. 2 and 4, a one-group cum ring 16 is disposed on an outer surface side of the fixed ring 11.

A bayonet groove 16a is formed in a front end portion of the one-group cum ring 16.

One-group cum grooves 16b, 16b, 16b and interlocking grooves 16c, 16c, 16c are formed in the one-group cum ring 16 so as to be made away from one another, respectively, in the circumference direction. The coupling rollers 15, 15, 15 which are mounted to the zoom focus cum ring 14 are slidably engaged with the interlocking grooves 16c, 16c, 16c, respectively.

A three-group movement ring 17 is disposed on an inner surface side of the zoom focus cum ring 14. A three-group lens holding frame 18 for holding the third lens group 8 is positioned in and mounted to the three-group movement ring 17 by a regulating mechanism which will be described later, and is fixed to the three-group movement ring 17 by bonding. Therefore, the three-group movement ring 17 functions as a mounting member to which the three-group lens holding frame 18 is mounted.

A diaphragm unit 19 is mounted to the three-group movement ring 17.

Figure 5:
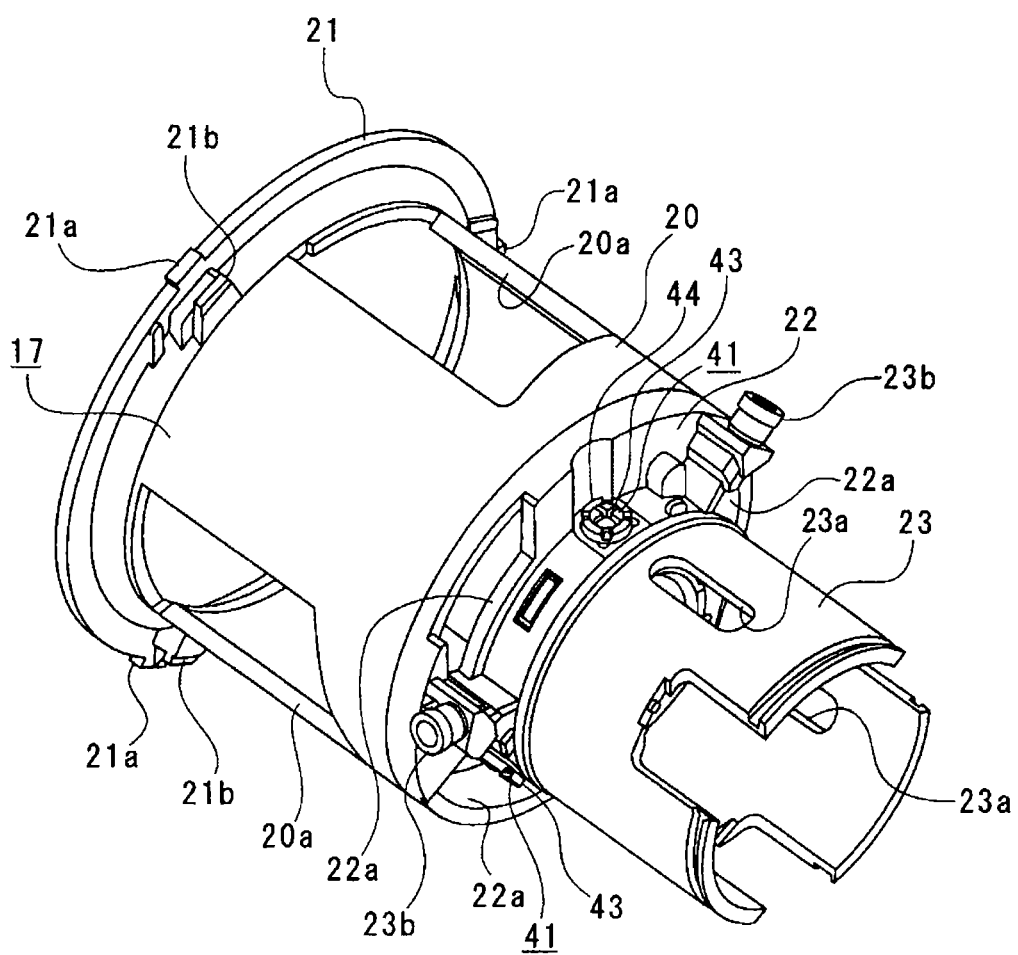
FIG. 5 is an enlarged perspective view of a three-group movement ring.
Figure 6:
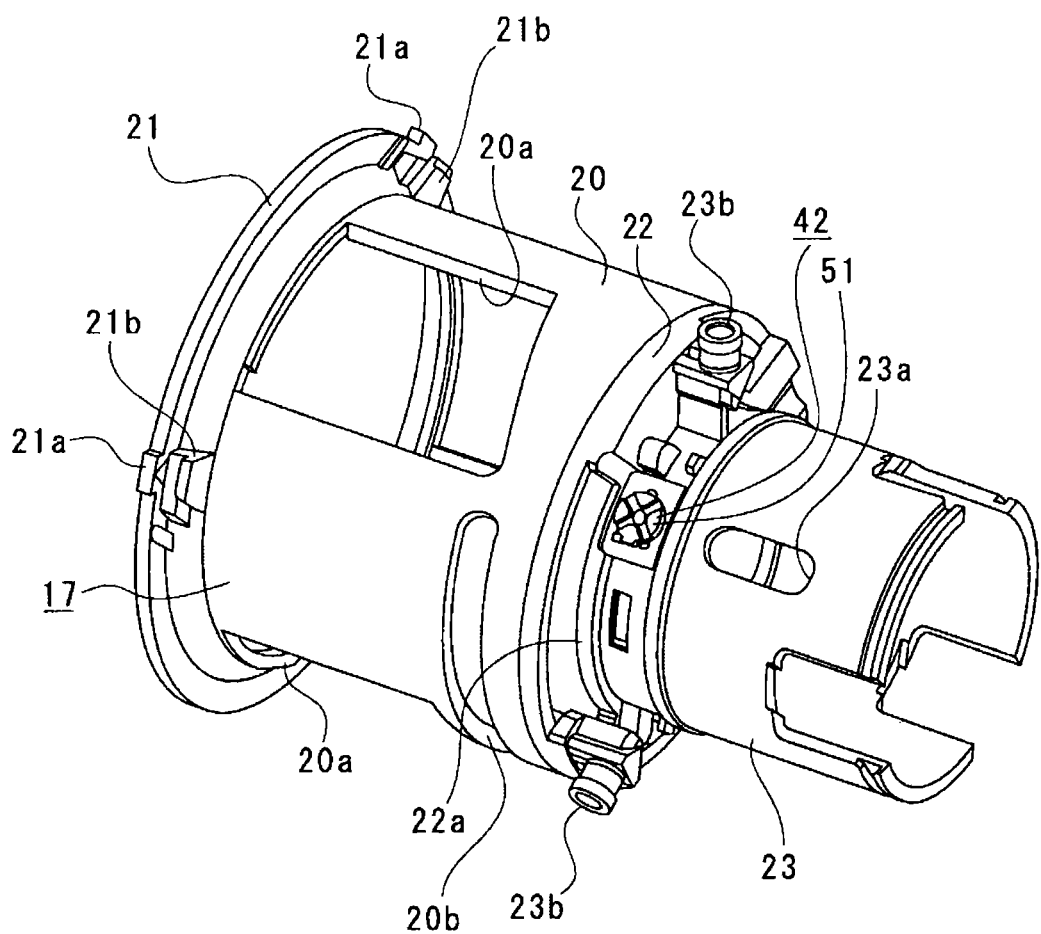
FIG. 6 is an enlarged perspective view of the three-group movement ring shown in a position different from that in the case of FIG. 5.

The three-group movement ring 17, as shown in FIGS. 2, 5, and 6, is composed of a front side tube portion 20, a flange portion 21, a coupling surface portion 22, and a back side tube portion 23. In this case, the flange portion 21 is projected outward from a front end portion of the front side tube portion 20. The coupling surface portion 22 is projected inward from a back end portion of the front side tube portion 20. Also, the back side tube portion 23 is projected backward from an inner circumference portion of the coupling surface portion 22.

Communication holes 20a, 20a, 20a each extending in the front-back direction are formed in the front side tube portion 20 so as to be made away from one another in the circumference direction. A supporting hole 20b extending in the circumference direction is formed in the back end portion of the front side tube portion 20.

One-group guide pieces 21a, 21a, 21a each projected outward are provided in the front end portion of the flange portion 21 so as to be made away from one another in the circumference direction. Bayonet claws 21b, 21b, 21b each projected outward are provided in the back end portion of the flange portion 21 so as to be made away from one another in the circumference direction. The bayonet claws 21b, 21b, 21b are slidably engaged with the bayonet groove 16a of the one-group cum ring 16.

Insertion holes 22a, 22a, 22a are formed in the coupling surface portion 22 so as to be made away from one another in the circumference direction.

Straight guide grooves 23a, 23a, 23a each extending in the front-back direction are formed in the back side tube portion 23 so as to be made away from one another in the circumference direction. Three-group rollers 23b, 23b, 23b are provided in the front end portion of the back side tube portion 23 so as to be made away from one another in the circumference direction. The three-group rollers 23b, 23b, 23b are slidably engaged with the three-group straight guide grooves 11a, 11a, 11a of the fixed ring 11, and the three-group cum grooves 14c, 14c, 14c of the zoom focus cum ring 14, respectively.

A four-group cum ring 24 is bayonet-coupled to the three-group movement ring 17. A protrusion portion 24a is provided in an approximately half portion, on a front side, of the four-group cum ring 24. The protrusion portion 24a is inserted into one of insertion holes 22a, 22a, 22a of the three-group movement ring 17 from the back side, and a portion other than the protrusion portion 24a is disposed on an outer surface side of the three-group movement ring 17.

Tapered cum grooves 24b, 24b, 24b are formed in a position close to the back end of the four-group cum ring 24 so as to be made away from one another in the circumference direction.

A four-group roller 24c is mounted to a front end portion of the protrusion portion 24a of the four-group cum ring 24. The four-group roller 24c is inserted through a supporting hole 20b which is formed in the front side tube portion 20 of the three-group movement ring 17. Thus, the four-group roller 24c is slidably engaged with the interlocking cum groove 14d of the zoom focus cum ring 14.

Therefore, the three-group movement ring 17 functioning as the mounting member is supported by the zoom focus cum ring 14. Thus, the zoom focus cum ring 14 functions as a supporting member for supporting the three-group movement ring 17.

The four-group cum ring 24 is rotated in a fixed portion in the optical axis direction with respect to the three-group movement ring 17 in conjunction with a zooming operation which will be described later.

As shown in FIG. 2, a four-group movement ring 25 is disposed on an inner surface side of the backside tube portion 23 of the three-group movement ring 17. A four-group lens holding frame 26 for holding the fourth lens group 9 is mounted to the four-group movement ring 25.

Tapered cum followers 27, 27, 27 are mounted to the four-group movement ring 25 so as to be made away from one another in the circumference direction. The tapered cum followers 27, 27, 27 are slidably engaged with the tapered cum grooves 24b, 24b, 24b, and the straight guide grooves 23a, 23a, 23a, respectively. Therefore, the four-group movement ring 25 is moved in the optical axis direction with respect to the three-group movement ring 17.

A two-group movement ring 28 is disposed on the inner surface side of the front side tube portion 20 in the three-group movement ring 17. Also, a two-group lens holding frame 29 for holding the second lens group 7 is mounted to the two-group movement ring 28.

A focus interlocking groove 28a extending in the front-back direction is formed in the two-group movement ring 28. Two-group rollers 30, 30, 30 are mounted to the two-group movement ring 28 so as to be made away from one another in the circumference direction. Two-group rollers 30, 30, 30 are respectively inserted through the communication holes 20a, 20a, 20a which are formed in the front side tube portion 20 of the three-group movement ring 17. Thus, the two-group rollers 30, 30, 30 are also slidably engaged with the two-group focus cum grooves 14a, 14a, 14a of the zoom focus cum ring 14, respectively.

A one-group movement ring 31 is disposed on the outer surface side of the one-group cum ring 16. One-group straight guide grooves 31a, 31a, 31a each extending in the front-back direction are formed in the inner surface of the one-group movement ring 31 so as to be made away from one another in the circumference direction. The one-group guide pieces 21a, 21a, 21a which are provided in the flange portion 21 of the three-group movement ring 17 are slidably engaged with the one-group straight guide grooves 31a, 31a, 31a, respectively.

One-group cum followers 32, 32, 32 are respectively mounted in positions close to the back end of the one-group movement ring 31 so as to be made away from one another in the circumference direction. The one-group cum followers 32, 32, 32 are slidably engaged with the one-group cum grooves 16b, 16b, 16b of the one-group cum ring 16, respectively.

A one-group lens holding frame 33 for holding the first lens group 6 is mounted to the front end portion of the one-group movement ring 31.

A one-group light blocking ring 34 is mounted to the outer surface of the one-group movement ring 31. The one-group light blocking ring 34 is fixed to the one-group cum ring 16. A zoom interlocking pin 34a is mounted to the one-group light blocking ring 34.

A zoom manipulation ring 35 is disposed on the outer surface side of the one-group light blocking ring 34. Also, the zoom manipulation ring 35 is rotatably supported by the intermediate tube 12. A pin straight guide groove 35a extending in the front-back direction is formed in the zoom manipulation ring 35. Thus, the zoom interlocking pin 34a is slidably engaged with the pin straight guide groove 35a.

A focus manipulation ring 36 is rotatably supported on the outer surface side of the intermediate tube 12. A focus interlocking ring 37 having an approximately circular ring-like shape is disposed on the inner surface side of the focus manipulation ring 36 in a rotatable state. A focus interlocking lever 38 whose portion except for the back end portion extends in the front-back direction is mounted to the focus interlocking ring 37. Also, the focus interlocking lever 38 is inserted through the insertion hole 12a of the intermediate tube 12 to be engaged with the focus interlocking groove 28a of the two-group movement ring 28 slidably in the front-back direction.

The focus interlocking lever 38 is mounted to the focus interlocking ring 37, and thus is rotated along with the rotation of the focus interlocking ring 37.

A back portion armoring ring 39 is disposed on the back end side of the focus manipulation ring 36. Also, a main substrate (not shown) in which an electric control circuit (not shown) for the interchangeable lens 3 is formed is disposed inside the back portion armoring ring 39.

A gear unit 40 for focus driving is disposed in the upper end portion in the inside of the back portion armoring ring 39.

[Zooming Operation in Lens Barrel]

Next, a description will now be given with respect to an operation in the lens barrel 3.

When the zoom manipulation ring 35 is manipulated for the rotation, a rotation driving force is transmitted to the zoom interlocking pin 34a which is engaged with the pin straight guide groove 35a. The rotation driving force is transmitted to the zoom interlocking pin 34a, whereby the one-group light blocking ring 34 and the one-group cum ring 16 are rotated integrally with each other.

When the one-group cum ring 16 is rotated, the zoom focus cum ring 14 is rotated along with the rotation of the one-group cum ring 16 because the coupling rollers 15, 15, 15 which are mounted to the zoom focus cum ring 14 are engaged with the interlocking grooves 16c, 16c, 16c of the one-group cum ring 16, respectively.

The fixed rollers 11b, 11b, 11b which are mounted to the fixed ring 11 are engaged with the cum grooves 14b, 14b, 14b for movement, respectively. Therefore, the zoom focus cum ring 14 is guided while the zoom focus cum ring 14 is rotated by the fixed rollers 11b, 11b, 11b to be moved in the optical axis direction.

The three-group rollers 23b, 23b, 23b which are mounted to the three-group movement ring 17 are respectively engaged with the three-group straight guide grooves 11a, 11a, 11a of the fixed ring 11, and the three-group cum grooves 14c, 14c, 14c of the zoom focus cum ring 14. Therefore, the three-group movement ring 17 is guided by the three-group straight guide grooves 11a, 11a, 11a to be moved in the optical direction. Also, both of the three-group lens holding frame 18 and the third lens group 8 are moved in the optical axis direction along with the movement of the three-group movement ring 17.

The four-group cum ring 24 is rotated in a fixed position in the optical axis direction with respect to the three-group movement ring 17 because the four-group roller 24c is engaged with the interlocking cum groove 14d of the zoom focus cum ring 14. Note that, a rotatable angle of the zoom manipulation ring 35, for example, is set to 75°. However, since the interlocking cum groove 14d is inclined, a rotatable angle of the four-group cum ring 24 becomes smaller than that of the zoom manipulation ring 35 and, for example, is set to 61.5°.

The tapered cum followers 27, 27, 27 are respectively engaged with the tapered cum grooves 24b, 24b, 24b of the four-group cum ring 24, and the straight guide grooves 23a, 23a, 23a of the three-group movement ring 23. Therefore, the four-group movement ring 25 is guided through the rotation of the four-group cum ring 24 by the straight guide grooves 23a, 23a, 23a to be moved in the optical axis direction. As a result, along with the movement of the four-group movement ring 25, both of the four-group lens holding frame 26 and the fourth lens group 9 are moved in the optical axis direction.

The bayonet claws 21b, 21b, 21b of the three-group movement ring 17 are engaged with the bayonet groove 16a. As a result, the one-group cum ring 16 is moved along with the rotation of the zoom manipulation ring 35 to be moved in the optical axis direction integrally with the three-group movement ring 17.

The one-group movement ring 31 is regulated in such a way that the one-group guide pieces 21a, 21a, 21a of the three-group movement ring 17 are engaged with the one-group straight guide grooves 31a, 31a, 31a, respectively, and thus the one-group movement 31 is straightly moved. In addition, the one-group cum followers 32, 32, 32 are respectively engaged with the one-group cum grooves 16b, 16b, 16b of the one-group cum ring 16. As a result, the one-group movement ring 31 is guided by the one-group guide pieces 21a, 21a, 21a through the operation of the one-group cum ring 16 to be moved in the optical axis direction. Also, along with the movement of the one-group movement ring 31, both of the one-group lens holding frame 33 and the first lens group 6 are moved in the optical axis direction.

The two-group movement ring 28 is regulated so as to be straightly moved by the focus interlocking lever 38 which stands still. Also, the two-group rollers 30, 30, 30 are engaged with the two-group focus cum grooves 14a, 14a, 14a, respectively. As a result, the two-group movement ring 28 is guided by the focus interlocking lever 38 through the rotation of the zoom focus cum ring 24 to be moved in the optical direction. Also, along with the movement of the two-group movement ring 28, both of the two-group lens holding frame 29 and the second lens group 7 are moved in the optical axis direction.

[Operation of Focusing in Lens Barrel]

Next, a description will now be given with respect to an operation of focusing in the lens barrel 3.

A driving force of a driving motor (DC motor) (not shown) which is provided in a gear unit 40 is reduced to low rotation and a high torque by a reduction gear group (not shown), and thus the focus interlocking ring 37 is driven for the rotation in the fixed position in the optical axis direction, thereby carrying out the auto-focusing operation.

On the other hand, the focus manipulation ring 36 is mutually manipulated, the driving force of the focus manipulation ring 36 is reduced by a reduction gear group of the reduction gear unit 40, and thus the focus interlocking ring 37 is driven for the rotation in the fixed position in the optical axis direction, thereby carrying out the manual-focusing operation.

Even in any of the auto-focusing operation and the manual-focusing operation, when the focus interlocking ring 37 is rotated, the focus interlocking lever 38 is rotated integrally with the focus interlocking ring 37. As a result, the driving force is transmitted to the two-group movement ring 28. When the driving force is transmitted to the two-group movement ring 28, the two-group rollers 30, 30, 30 which are mounted to the two-group movement ring 28 slide over the two-group focus cum grooves 14a, 14a, 14a of the zoom focus cum ring 14, respectively. The two-group rollers 30, 30, 30 slide over the two-group focus cum grooves 14a, 14a, 14a, respectively, whereby the two-group movement ring 28, the two-group lens holding frame 29, and the second lens group 7 are all moved in the optical axis direction integrally with one another, thereby carrying out either the auto-focusing operation or the manual-focusing operation.

[Regulating Mechanism in Lens Barrel]

Next, a description will now be given with respect to a regulating mechanism in the lens barrel 3 with reference to FIGS. 5 to 14.

In the lens barrel 3, for example, the position of the third lens group 8 with respect to the optical axis is regulated. This regulation is carried out by carrying out both of the inclination regulation and the eccentricity regulation of the three-group lens holding frame 18 for the three-group movement ring 17. It is noted that in the lens barrel 3, the regulation is carried out in a semi-completion state in which the entire optical system is held, for example, in a state in which the lens holding frames (33, 29, 18, 26) for holding the lens groups (6, 7, 8, 9) are respectively mounted to the movement rings (31, 28, 17, 25), and the fixed ring 17, the zoom focus cum ring 14, the one-group cum ring 16, and the four-group cum ring 24 are assembled to the movement rings (31, 28, 17, 25).

Figure 11:
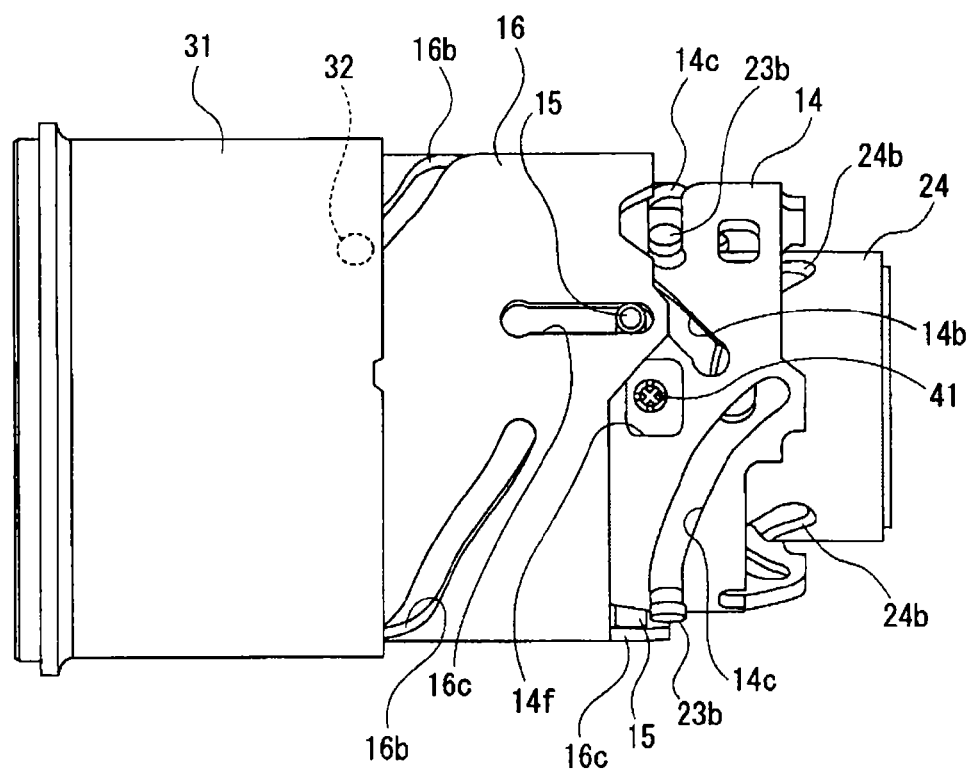
FIG. 11 is a side elevational view showing the lens barrel in a telephoto end state with a part of the lens barrel being omitted.

In addition, as shown in FIG. 11, the regulation is carried out in a telephoto end state, that is, in a state in which the zoom focus cum ring 14 is located in a first position with respect to the three-group movement ring 17. The telephoto end state is a state in which the sensitivity of the optical system is highest in the variable power area, and thus the regulation is carried out in the telephoto end state, thereby enhancing the regulation precision.

Figure 8:
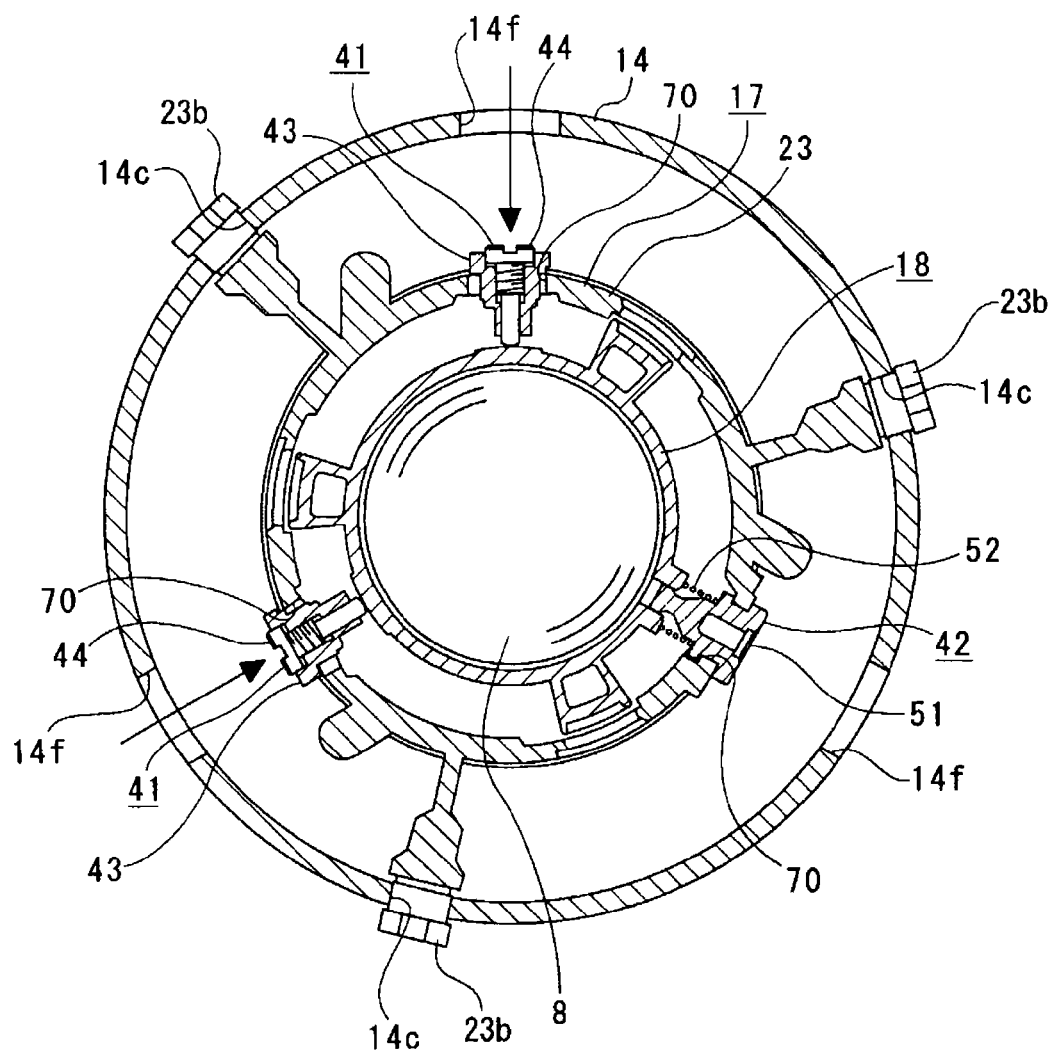

As shown in FIG. 8, the regulating mechanism, for example, is composed of two movable side regulating portions 41, 41, and one reception side regulating portion 42.

Figure 7:
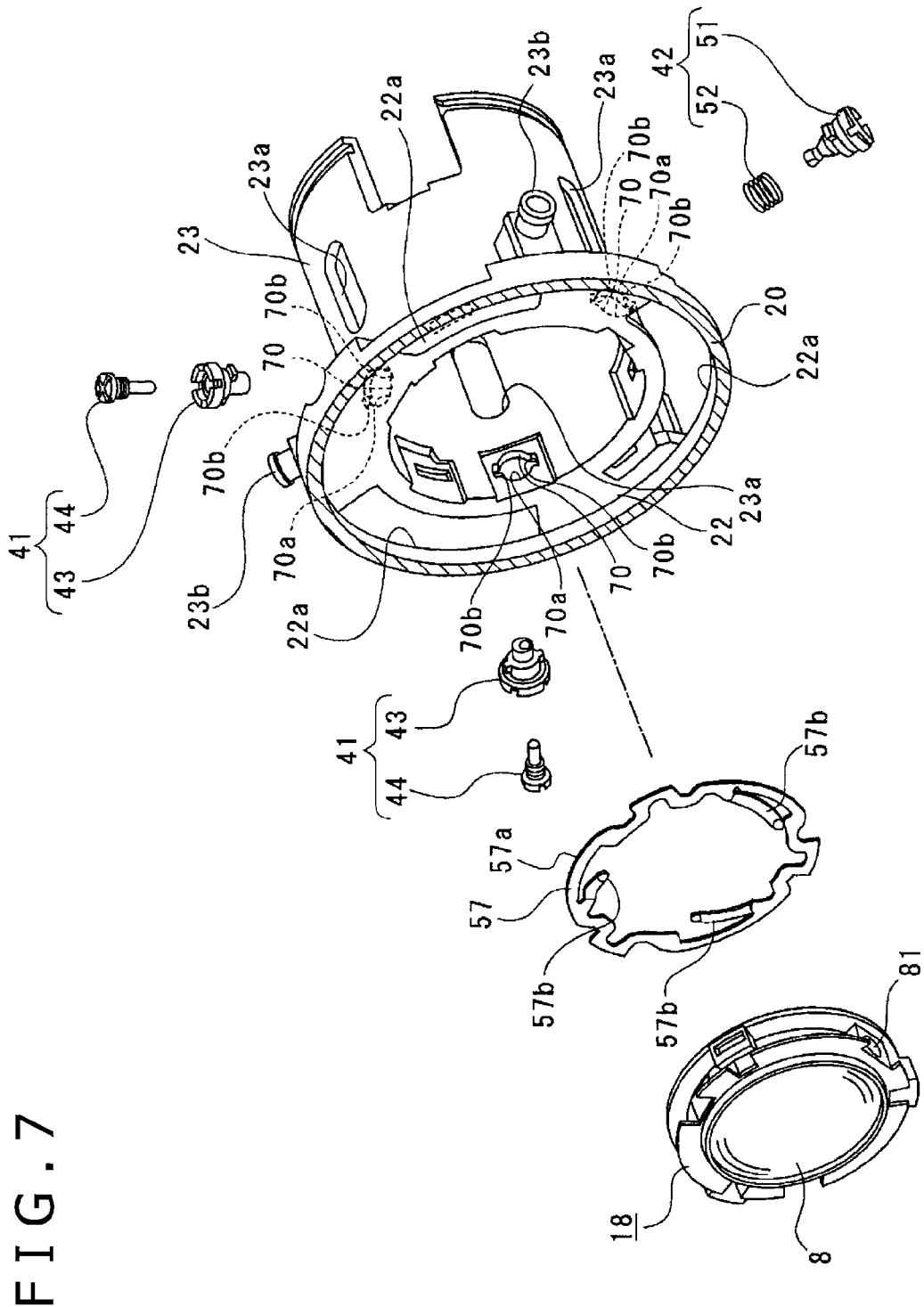
FIG. 7 is an enlarged exploded perspective view showing a part of the three-group movement ring, and portions which are to be mounted to the three-group movement ring.
Figure 9:
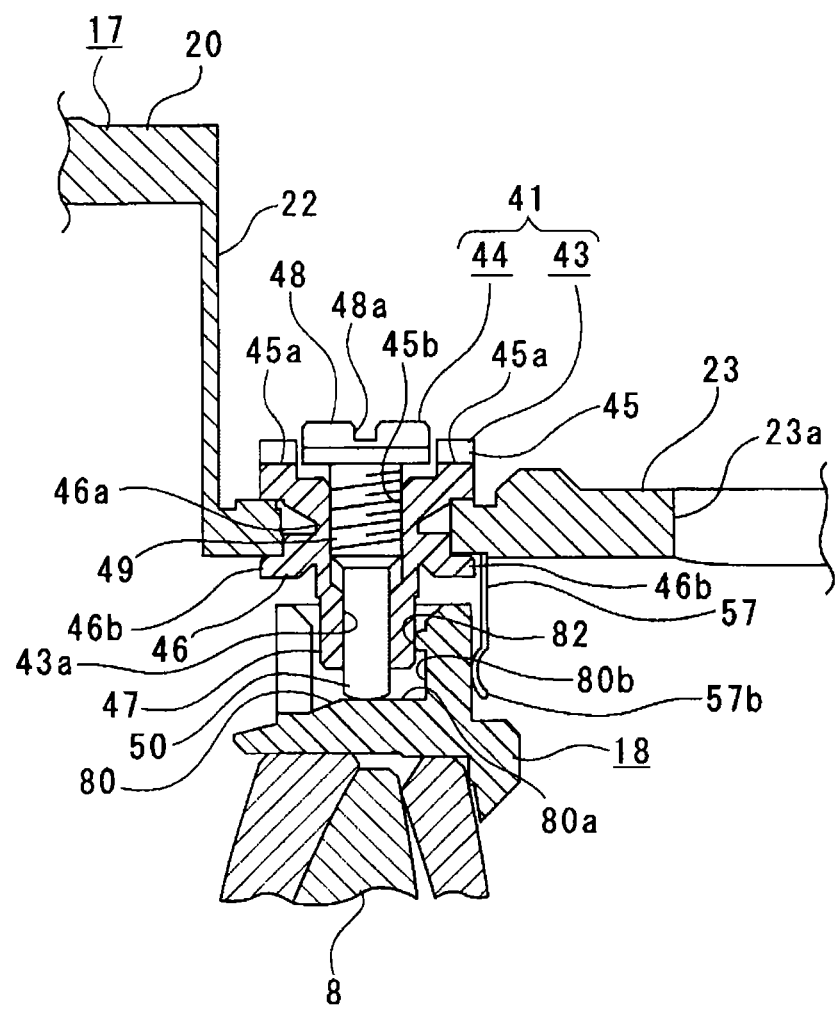
FIG. 9 is an enlarged cross sectional view showing a movable side regulating portion.
Figure 12:
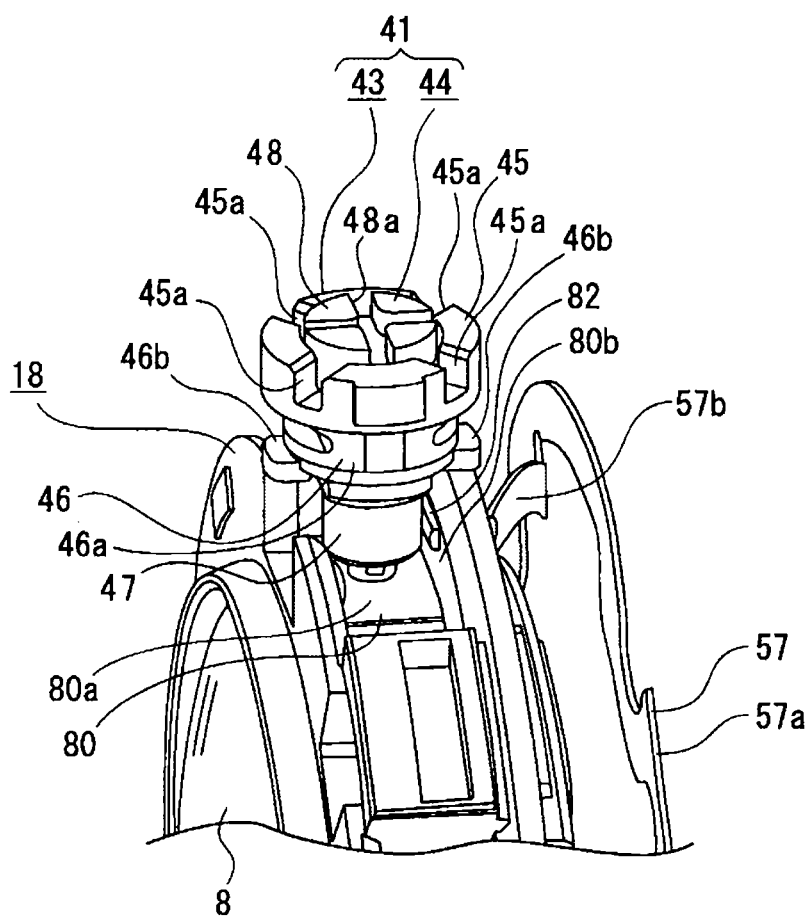

Member supporting holes 70, 70, 70 are formed in the back side tube portion 23 of the three-group movement ring 17 so as to be made away from one another in the circumference direction. Also, as shown in FIGS. 7, 9, and 12, the movable side regulating portions 41, 41 and the reception side regulating portion 42 are supported by the member supporting holes 70, 70, and the member supporting hole 70, respectively. The member supporting hole 70 is composed of a central portion 70a, and side portions 70b, 70b which are respectively formed on sides opposite to each other at 180° in a radial direction of the central portion 70a.

The movable side regulating portion 41 is composed of an inclination regulating member 43, and an eccentricity regulating member 44 which is rotatably supported by the inclination regulating member 43.

The inclination regulating member 43 is formed in a tube-like shape which extends in the radiation direction perpendicular to the optical axis, and has an insertion supporting hole 43a. Also, the inclination regulating member 43 is composed of a screw supporting portion 45, an insertion portion 46, and a supporting tube portion 47 which are continuously provided in order from the outer side.

Slots 45a, 45a, . . . for a work are formed in an outer end portion in the axis direction of the screw supporting portion 45 so as to be made away from one another in the circumference direction. Also, a screw groove portion 45b is formed in an inner circumference surface of the screw supporting portion 45.

The insertion portion 46 is composed of a base portion 46a, and regulated protrusion portions 46b, 46b which are protruded to opposite sides, respectively, from the base portion 46a. Although the base portion 46a, the insertion supporting hole 43a, and the screw groove portion 45b of the insertion portion 46 are formed so as to have approximately the same axis, the supporting tube portion 47 is formed in an eccentric position. As a result, when the inclination regulating member 43 is rotated, it is possible to change an abutment portion, in the optical axis direction, between the supporting tube portion 47 and an operated portion 82.

In the inclination regulating member 43, the insertion portion 46 is inserted through a member supporting hole 70 of the three-group movement ring 17. At this time, the base portion 46a is inserted into the central portion 70a, and the regulated protrusion portions 46b, 46b are inserted into side portions 70b, 70b, respectively, to be rotated with respect to the three-group movement ring 17. As a result, the screw supporting portion 45, and the regulated protrusion portions 46b, 46b are respectively engaged with opening edges of the member supporting hole 70, and thus are supported in the rotatable state by the three-group movement ring 17.

The member supporting hole 70 and the base portion 46a have moderate press sizes, respectively, to the degree that the rotation manipulation can be carried out. In addition, the regulated protrusion portion 46b also has the moderate press size in the radial direction with respect to the three-group movement ring 17. In addition thereto, the screw portion 49 of the eccentricity regulating member 44, and the screw groove portion 45b of the inclination regulating member 43 also have the moderate press sizes, respectively, to the degree that the rotation manipulation can be carried out. The rotation manipulation torque of the inclination regulating member 43 is set larger than that of the single eccentricity regulating member 44. Thus, the setting is carried out in such a way that the inclination regulating member 43 is not changed and also does not make rotational transfer when the eccentricity regulation is carried out.

The eccentricity regulating member 44 is composed of a head portion 48, a screw portion 49, and a supported axis portion 50 which are continuously provided in order from the outer side. A cross-shaped groove 48a for a work is formed in the head portion 48. In the eccentricity regulating member 44, the screw portion 49 is screwed into the screw groove portion 45b, and the supported axis portion 50 is inserted into the supporting tube portion 47 in an inner fitting style to be rotatably supported by the inclination regulating member 43.

As shown in FIGS. 7, 8, 10, and 13, the reception side regulating portion 42 is composed of a holding member 51, and a spring member 52, for example, serving as a helical compression spring.

The holding member 51 has a function of holding the three-group lens holding frame 18 in the three-group movement spring 17 in a phase of the regulation of the inclination regulating members 43, 43, and the eccentricity regulating members 44, 44. Also, the holding member 51 is composed of a head portion 53, a spring receiving portion 54, an axis portion 55, and an abutment portion 56 which are continuously provided in order from the outer side. In the holding member 51, a major diameter of the head portion 53 is made larger than that of the spring receiving portion 54, and a major diameter of the spring receiving portion 54 is made larger than that of the axis portion 55.

A cross-shaped groove 53a for a work is formed in the head portion 53. The spring receiving portion 54 is composed of a circular insertion portion 54a, and engagement protrusion portions 54b, 54b which are protruded to sides opposite to each other, respectively, from the insertion portion 54a.

Figure 14:
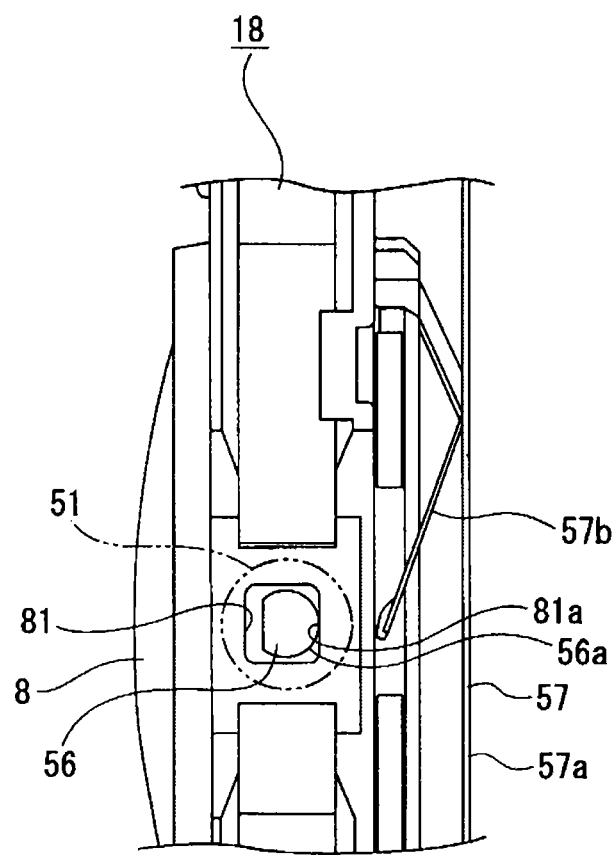

As shown in FIG. 14, the abutment portion 56, for example, is formed in a barrel-like shape in cross section, and an outer circumference surface 56a thereof is formed in a curved surface-like shape except for a part thereof.

In the holding member 51, the insertion portion 54 is inserted into a member supporting hole 70 of the three-group movement ring 17. At this time, the insertion portion 54a is inserted into a central portion 70a, and the engagement protruding portions 54b, 54b are respectively inserted into side portions 70b, 70b to be rotated with respect to the three-group movement ring 17. As a result, the head portion 53, and the engagement protruding portions 54b, 54b are respectively engaged with the opening edges of the member supporting hole 20 and thus are supported in the rotatable state by the three-group movement ring 17.

As shown in FIGS. 9, 10, 12, and 13, first coupling holes 80, 80 which are opened outward in the radiation direction, and second coupling hole 81 which extends completely through the three-group lens holding frame 18 in the radiation direction are provided in the three-group lens holding frame 18 so as to be made away from each other in the circumference direction.

A bottom surface forming the first coupling hole 80 is formed as an operated surface 80a. A back surface 80b forming the first coupling hole 80 is provided with an operated portion 82 which is protruded forward.

The second coupling hole 81, for example, is formed approximately in a rectangular shape.

Figure 13:
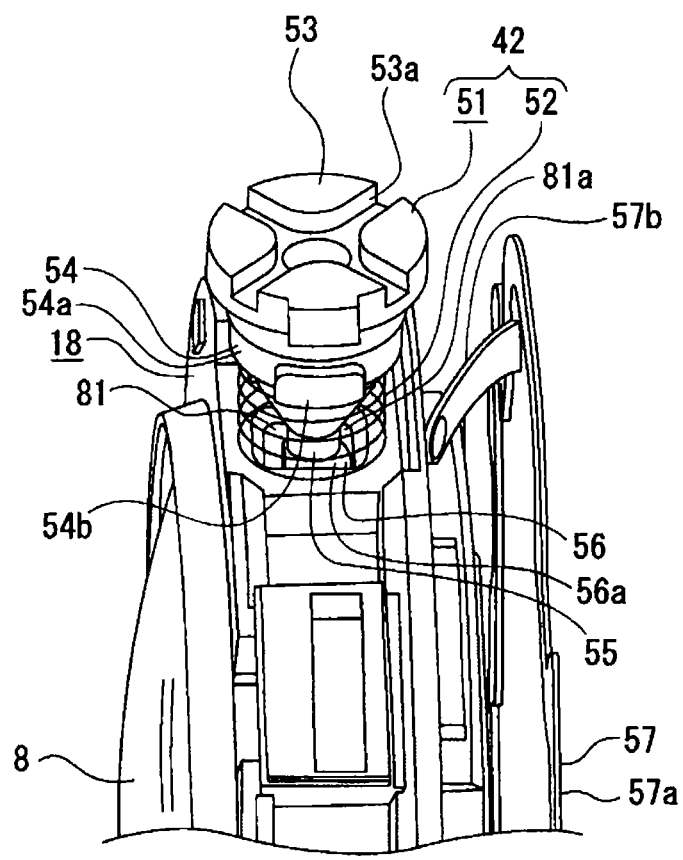

As shown in FIGS. 7, 12, and 13, a biasing spring 57 is attached to the inside of the three-group movement ring 17. The biasing spring 57 is composed of a ring-like base portion 57a, and elastic portions 57b, 57b, 57b which are bent forward from the base portion 57a. Also, a part of the ring-like base portion 57a is attached to the inner circumference portion of the three-group movement ring 17 through the engagement therewith. The elastic portions 57b, 57b, 57b are provided so as to be made away from one another in the circumference direction.

The elastic portions 57b, 57b, 57b of the biasing spring 57 are pressed against the back surface of the three-group lens holding frame 18, so that the three-group lens holding frame 18 is biased forward.

In a state in which the inclination regulating member 43 is rotatably supported by the three-group movement ring 17, and the eccentricity regulating member 44 is rotatably supported by the inclination regulating member 43, as shown in FIG. 9, a head surface of the supported axis 50 of the eccentricity regulating member 44 comes in contact with the operated surface 80a of the three-group lens holding frame 18. At this time, since the three-group lens holding frame 18 is biased forward by the biasing spring 57, the operated portion 82 is pressed against the outer circumference surface of the supporting tube portion 47 in the inclination regulating member 43. The supporting tube portion 47 of the inclination regulating member 43 comes in point-contact with the operated portion 82.

Figure 10:
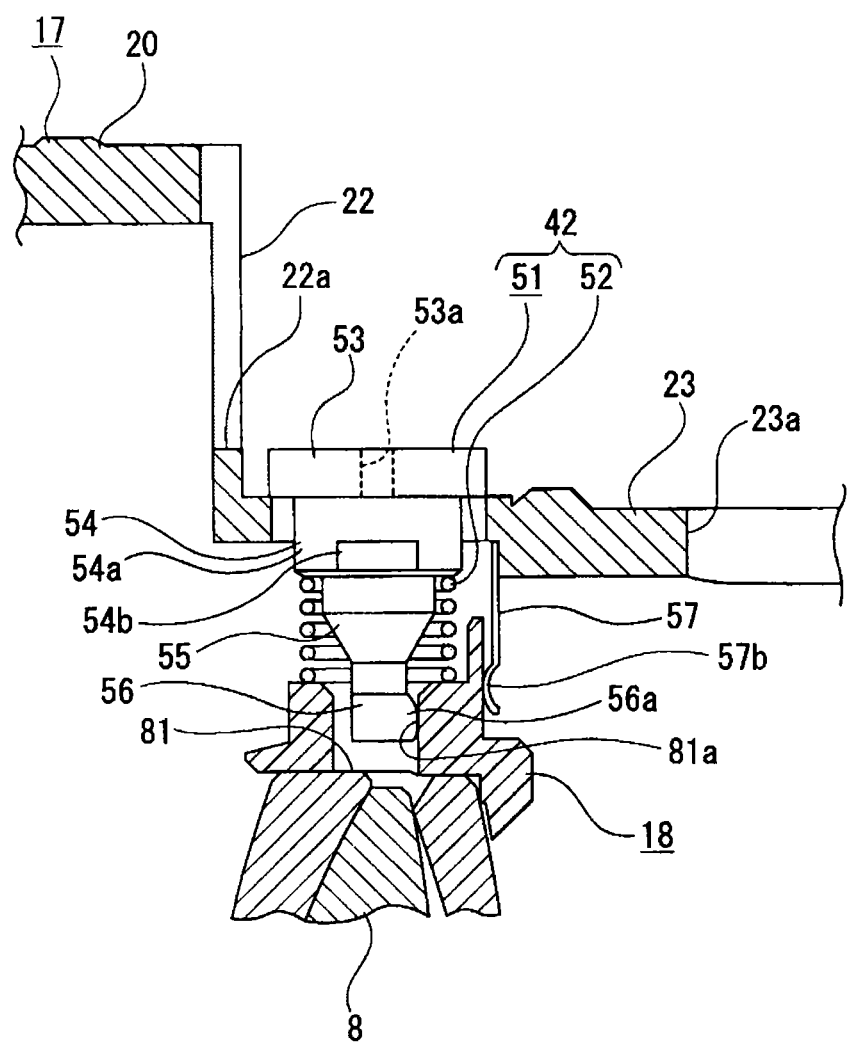
FIG. 10 is an enlarged cross sectional view showing a part of a reception side regulating portion.

In the state in which the eccentricity regulating member 44 is rotatably supported by the three-group movement ring 17, the spring member 52 is supported between the spring receiving portion 54 of the holding member 51, and the outer circumference surface of the three-group lens holding frame 18. Therefore, the three-group lens holding frame 18 is biased in the radiation direction and as a result, the operated surfaces 80a, 80a are pressed against the supported axes 50, 50 of the eccentricity regulating members 44, 44, respectively. At this time, since the three-group lens holding frame 18 is biased forward by the biasing spring 57, as shown in FIGS. 10 and 14, a wall surface (inner circumference surface) 81a forming the second coupling hole 81 is pressed against the abutment portion 56 of the holding member 51.

An outer circumference surface 56a which is formed in a curved surface-like shape of the abutment portion 56 comes in contact with the wall surface 81a. As a result, the outer circumference surface 56a comes in point-contact with the wall surface 81a in either one or plural positions.

[Regulating Work by Regulating Mechanism]

Next, a description will now be given with respect to a regulating work for the three-group lens holding frame 18 by the regulating mechanism described above.

The regulating work, firstly, is carried out by rotating the inclination regulating member 43 and the eccentricity regulating member 44 integrally with each other by using a jig (not shown). At this time, a part of the jig is engaged with the slot 45a of the inclination regulating member 43, and the groove 48a for a work of the eccentricity regulating member 44 and as a result, the inclination regulating member 43 and the eccentricity regulating member 44 are rotated integrally with each other.

One of the inclination regulating members 43, 43 and one of the eccentricity regulating members 44, 44 are rotated integrally with each other, and the other of the inclination regulating members 43, 43 and the other of the eccentricity regulating members 44, 44 are also rotated integrally with each other, thereby carrying out the regulation.

When the inclination regulating member 43 and the eccentricity regulating member 44 are rotated integrally with each other, the supporting tube portion 47 of the inclination regulating member 43 slides over the operated portion 82. At this time, since the supporting tube portion 47 is formed in the eccentric position, the position of the operated portion 82 in the optical axis direction with respect to the supporting tube portion 47 is changed depending on the rotational position of the inclination regulating member 43. Therefore, an inclination angle of the three-group lens holding frame 18 with respect to the three-group movement ring 17 is changed and as a result, the inclination of the third lens group 8 with respect to the optical axis is regulated.

At this time, the operated portion 82 is pressed against the outer circumference surface of the supporting tube portion 47 in the inclination regulating member 43 by the biasing force of the biasing spring 57. In addition, the wall surface 81a forming the second coupling hole 81 is pressed against the abutment portion 56 by the biasing force of the biasing spring 57.

Therefore, the backlash of the three-group lens holding frame 18 with respect to the inclination regulating member 43, and the eccentricity regulating member 44 is prevented from being generated. As a result, it is possible to enhance the regulation precise about the inclination with respect to the optical axis.

In addition, the inclination regulating member 43 comes in contact with the three-group lens holding frame 18 in the optical axis direction. Also, the inclination of the three-group lens holding frame 18 with respect to the three-group movement ring 17 is changed by the rotation of the inclination regulating member 43 with respect to the three-group movement ring 17, thereby regulating the inclination of the three-group lens holding frame 18 with respect to the three-group movement ring 17. As a result, it is possible to readily carry out the regulation by the regulating mechanism having the simple structure.

In addition thereto, the operated portion 82 with which the inclination regulating member 43 comes in contact is provided in the three-group lens holding frame 18, and thus, the inclination regulating member 43 comes in point-contact with the operated portion 82. Therefore, the contact position of the three-group lens holding frame 18 with the inclination regulating member 43 is easy to determine. As a result, it is possible to further enhance the regulation precision.

When the inclination regulating member 43 and the eccentricity regulating member 44 are rotated integrally with each other in the manner as described above, thereby carrying out the regulating work for the inclination, next, the eccentricity regulating member 44 is rotated with respect to the inclination regulating member 43 by using a jig (not shown), thereby carrying out the regulation for the eccentricity. At this time, a part of the jig is engaged with the groove 48a for a work of the eccentricity regulating member 44 and as a result, the eccentricity regulating member 44 is rotated with respect to the inclination regulating member 43.

One of the eccentricity regulating members 44, 44 is rotated, and the other the eccentricity regulating members 44, 44 is also rotated, thereby carrying out the regulation.

When the eccentricity regulating member 44 is rotated with respect to the inclination regulating member 43, the screw portion 49 of the eccentricity regulating member 44 is screwed into the screw groove portion 45b of the inclination regulating member 43. As a result, the position of the three-group lens holding frame 18 in the radiation direction with respect to the three-group movement ring 17 is changed depending on the rotational position of the eccentricity regulating member 44 with respect to the inclination regulating member 43. Therefore, there is regulated the eccentricity of the third lens group 8 with respect to the optical axis of the third lens group 8.

As described above, in the lens barrel 3, the screw portion 49 which is provided in the eccentricity regulating member 44 is screwed into the screw groove 45b which is formed in the inclination regulating member 43, thereby carrying out the regulation. As a result, it is possible to carry out the fine regulation. As a result, it is possible to enhance the regulation precision.

At this time, the operated surface 80a of the three-group lens holding frame 18 is pressed against the supported axis 50 of the eccentricity regulating member 44 by the biasing force of the spring member 52.

Therefore, the backlash of the three-group lens holding frame 18 with respect to the eccentricity regulating member 44 is prevented from being generated. As a result, it is possible to enhance the regulation precise about the eccentricity with respect to the optical axis.

There is stabilized the screwing state between the screwing groove portion 45b of the inclination regulating member 43, and the screw portion 49 of the eccentricity regulating member 44. Therefore, there is improved the reliability in the operation of the rotation of the eccentricity regulating member 44 with respect to the inclination regulating member 43. As a result, it is possible to realize the proper operation in the regulation about the eccentricity.

In addition thereto, the eccentricity regulating member 44 comes in contact with the three-group lens holding frame 18 in the radiation direction. Also, the position of the three-group lens holding frame 18 with respect to the three-group movement ring 17 is changed by the rotation of the eccentricity regulating member 44 with respect to the three-group movement ring 17, thereby regulating the eccentricity of the three-group lens holding frame 18. As a result, it is possible to readily carrying out the regulation by the regulating mechanism having the simple structure.

Moreover, there is provided the holding member 51 for holding the three-group lens holding frame 18 in the three-group movement ring 17 in the phase of the regulation of the inclination regulating member 43 and the eccentricity regulating member 44. Therefore, the regulation is carried out in the state in which the three-group lens holding frame 18 is held in the three-group movement ring 17 by the holding member 51. As a result, it is possible to precisely and speedily carry out the regulation for the three-group lens holding frame 18.

Furthermore, the abutment portion 56 of the holding member 51 comes in point-contact with the wall surface 81a of the second coupling hole 81 which is formed in the three-group lens holding frame 18. Therefore, the contact position of the three-group lens holding frame 18 for the holding member 51 is easy to determine. As a result, it is possible to further enhance the regulation precision.

Figure 15:
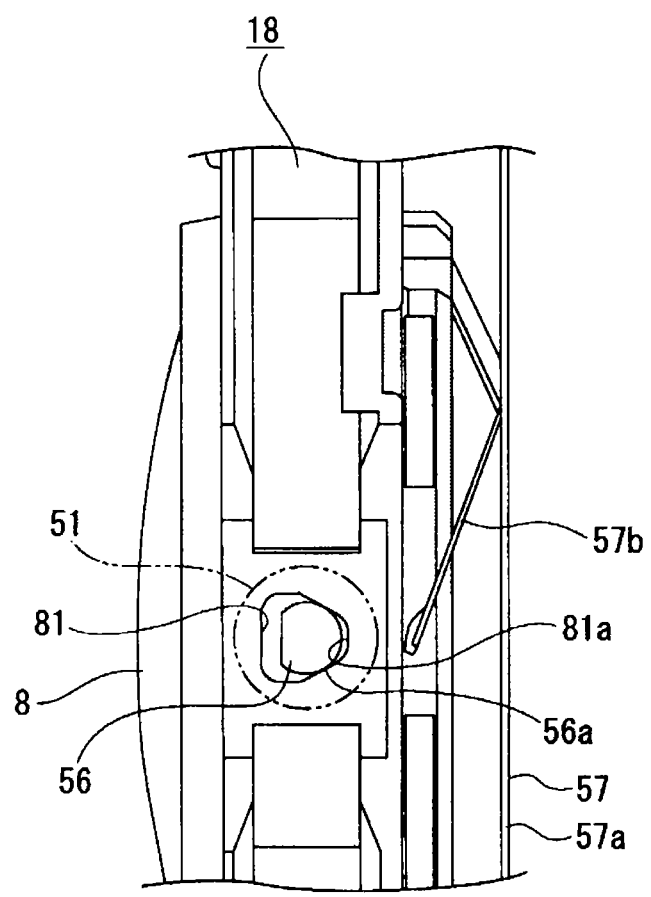
FIG. 15 is an enlarged top plan view showing the reception side regulating portion, and the like in which an abutment portion has a different shape.

It is noted that although in the foregoing, there has been shown the case where the second coupling hole 81 of the three-group lens holding frame 18 is formed approximately in the rectangle shape, alternatively, for example, as shown in FIG. 15, the second coupling hole 81 may be formed in a shape whose width becomes narrow in the more backward position. In this case, the abutment portion 56 of the holding member 51 comes in contact with two portions of the wall surface 81a of the second coupling hole 81.

In addition, the abutment portion 56 may be formed in cross section in any of other kinds of shapes other than the barrel shape. For example, the abutment portion 56 may be formed in a spherical shape, a hemispherical shape, an elliptical shape, a quadrangular shape, a V letter-like shape or the like. However, preferably, the abutment portion 56 is formed in a shape in which the abutment portion 56 comes in point-contact with the wall surface 81a of the second coupling hole 81.

When the regulation for the inclination with respect to the optical axis, and the regulation for the eccentricity with respect to the optical axis have been completed in the manner as described above, there is carried out a fixing work for fixing the three-group lens holding frame 18 to the three-group movement ring 17 by the bonding. In this case, the fixing work, for example, is carried out in an intermediate state as an intermediate position between a wide-angle end state and the telephoto end state.

In the intermediate state, an adhesive agent, for example, an ultraviolet curing type adhesive agent is filled from the work holes 14f, 14f, 14f to both of the three-group movement ring 17 and the three-group lens holding frame 18. Then, the three-group movement ring 17 is bonded and fixed to the three-group lens holding frame 18 by radiating an ultraviolet ray to the adhesive agent.

[Configuration of Image Pickup Apparatus]

Figure 16:
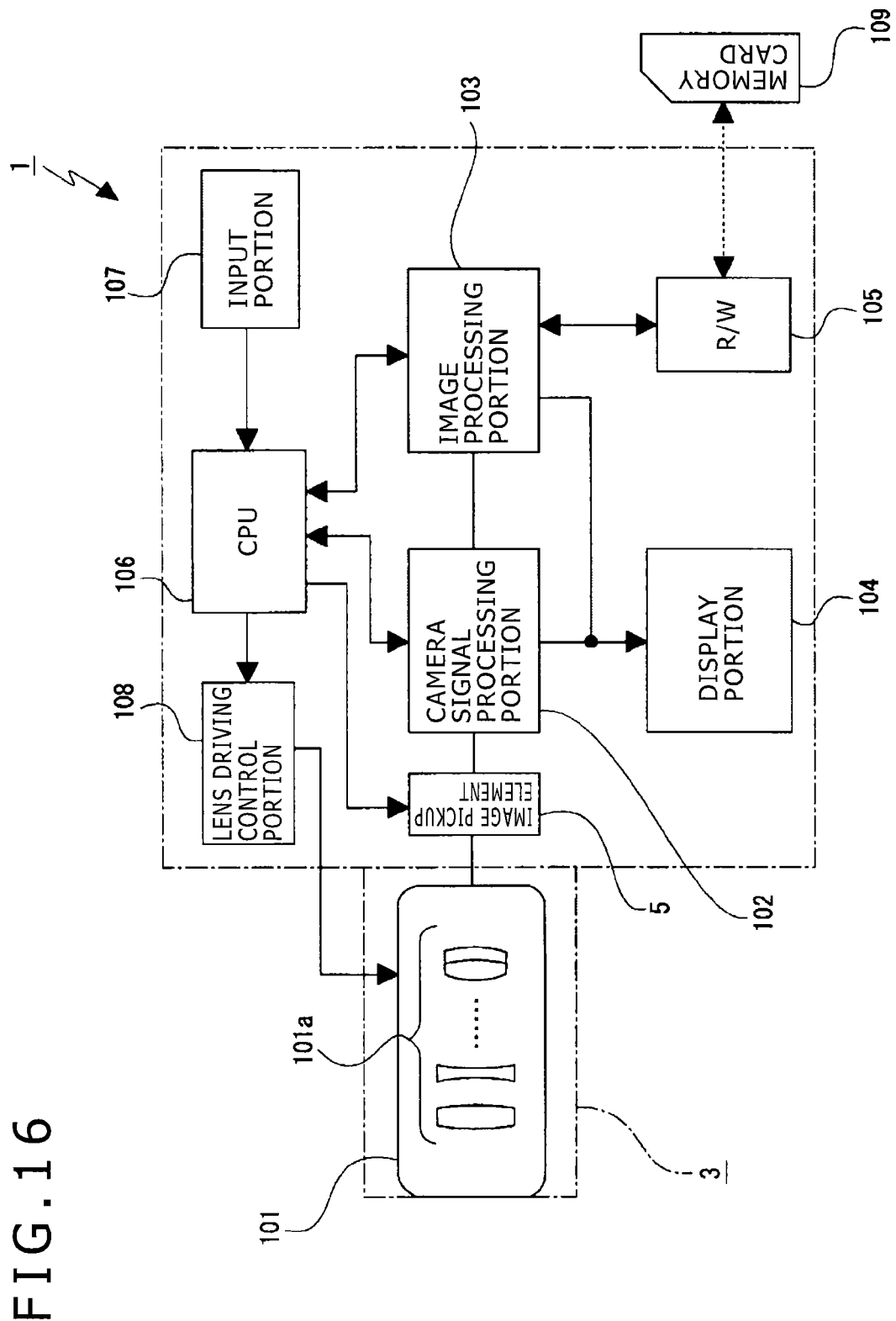
FIG. 16 is a block diagram showing a configuration of the image pickup apparatus according to the first embodiment of the present disclosure.

FIG. 16 is a block diagram showing a configuration of the interchangeable lens type digital camera as the image pickup apparatus 1 according to the first embodiment of the present disclosure.

The interchangeable lens type digital camera as the image pickup apparatus 1 includes a camera block 101, a camera signal processing portion 102, and an image processing portion 103. In this case, the camera block 101 plays the role of the image capturing function. The camera signal processing portion 102 executes signal processing, such as an analog-to-digital conversion, for an image signal obtained through the image capturing in the camera block 101. Also, the image processing portion 103 executes processing for recording/reproducing the image signal. In addition, the image pickup apparatus 1 includes a display portion 104, a Reader/Writer (R/W) 105, a Central Processing Unit (CPU) 106, an input portion 107, and a lens driving control portion 108. In this case, the display portion 104 is composed of a Liquid Crystal Display (LCD) device or the like for displaying thereon the image captured by the camera block 101. The R/W 105 writes and reads out the image signal to and from a memory card 109. The CPU 106 controls the whole of the image pickup apparatus 1. The input portion 107 is composed of various kinds of input manipulation portions 4a, 4a, . . . with which a desired manipulation is carried out by a user, or the like. Also, the lens driving control portion 108 controls the driving for an optical element 101a such as the lens or the lens group which is disposed in the camera block 101.

The camera block 101, for example, is provided in the lens barrel 3, and includes the optical element 101a such as the lens or the lens group.

The camera signal processing portion 102 executes various kinds of pieces of signal processing such as conversion from an analog output signal supplied from the image pickup element 5 to a digital signal, noise removal, image quality conversion, and conversion to a luminance/color difference signal.

The image processing portion 103 executes compression encoding/extension decoding processing for the image signal based on a predetermined image data format, processing for converting a data specification such as a resolution, and the like.

The display portion 104 has a function of displaying thereon various kinds of pieces of data on the state of the manipulation for the input portion 107 made by the user, the captured image, and the like.

The R/W 105 carries out an operation for writing the image data which has been encoded by the image processing portion 103 to the memory card 109, and an operation for reading out the image data recorded in the memory card 109.

The CPU 106 functions as a control processing portion for controlling the circuit blocks provided in the image pickup apparatus 1. Thus, the CPU 106 controls the circuit blocks in accordance with an instruction input signal issued from the input portion 107, or the like.

The input portion 107 outputs an instruction input signal corresponding to the manipulation made by the user to the CPU 106.

The lens driving control portion 108 controls a motor (not shown) for driving the lenses of the optical system 101a, and the like in accordance with a control signal issued from the CPU 106.

The memory card 109, for example, is composed of a semiconductor memory which is detachably inserted into a slot which is connected to the R/W 105.

Hereinafter, a description will now be given with respect to an operation of the interchangeable lens type digital camera as the image pickup apparatus 1 according to the first embodiment of the present disclosure.

In a stand-by state in the photographing, under the control made by the CPU 106, the signal corresponding to the image captured by the camera block 101 is outputted to the display portion 104 through the camera signal processing portion 102 and is then displayed in the form of a camera-through image. When an instruction input signal for the zooming is inputted from the input portion 107 to the CPU 106, the CPU 106 outputs the control signal to the lens driving control portion 108 and as a result, the predetermined lens or lens group of the optical system 101a is moved in accordance with the control made by the lens driving control portion 108.

When a shutter (not shown) of the camera block 101 is operated in accordance with the instruction input signal issued from the input portion 107, the analog signal corresponding to the image captured is outputted from the camera signal processing portion 102 to the image processing portion 103 to be subjected to the compression encoding processing. As a result, the resulting analog image signal is converted into the digital data complying with the predetermined data format. The digital data obtained through the conversion is outputted to the R/W 105 and is then written to the memory card 109.

For example, when the shutter button 4a of the input portion 107 is pressed halfway, when the shutter button 4a of the input portion 107 is fully pressed for the recording (photographing), or when the focus manipulation ring 36 of the lens barrel 3 is manipulated by the user, the lens driving control portion 108 moves the predetermined lens or lens group of the optical system 101a in accordance with the control signal issued from the CPU 106, thereby carrying out the focusing.

When the image data recorded in the memory card 109 is intended to be reproduced, the predetermined image data is read out from the memory card 109 by the R/W 105 in accordance with the manipulation made for the input portion 107 by the user to be subjected to the extension decoding processing by the image processing portion 103. After that, the resulting reproduced image signal is outputted to the display portion 104, thereby displaying the reproduced image on the display portion 104.

CONCLUSIONS

As described above, the lens barrel 3 includes the inclination regulating member 43 for regulating the position of the three-group lens holding frame 18 with respect to the three-group movement ring 17, thereby regulating the inclination of the three-group lens holding frame 18 with respect to the optical axis, and the eccentricity regulating member 44 for regulating the position of the three-group lens holding frame 18 with respect to the three-group movement ring 17, thereby regulating the eccentricity of the three-group lens holding frame 18 with respect to the optical axis. In this case, the eccentricity regulating member 44 is supported by the inclination regulating member 43.

Therefore, both of the inclination regulating member 43 and the eccentricity regulating member 44 are disposed in the same space. Also, it is possible to carry out the regulation of the inclination of the three-group lens holding frame 18 with respect to the optical axis, and the regulation of the eccentricity of the three-group lens holding frame 18 with respect to the optical axis in the same position. As a result, it is possible to realize the miniaturization, and the facilitation of the regulating work.

In addition, the inclination regulating member 43 is rotatably supported by the three-group movement ring 17 with the axis extending in the radiation direction perpendicular to the optical axis direction as the fulcrum. Also, the eccentricity regulating member 44 is rotatably supported by the inclination regulating member 43 with the axis extending in the radiation direction perpendicular to the optical axis direction as the fulcrum.

Therefore, the regulation for the inclination of the three-group lens holding frame 18 with respect to the optical axis, and the regulation for the eccentricity of the three-group lens holding frame 18 with respect to the optical axis can be both carried out by rotating both of the inclination regulating member 43 and the eccentricity regulating member 44. As a result, it is possible to realize the facilitation of the regulation with the simple structure.

In addition, the plural inclination regulating members 43, 43 and the plural eccentricity regulating members 44, 44 are provided in the circumference direction so as to be made away from each other. As a result, the plural regulation positions are obtained, and thus it is possible to enhance the high regulation precision.

It is noted that although in the foregoing, there is shown the case where the regulating mechanism is composed of the variable side regulating portions 41, 41 and the reception side regulating portion 42, alternately, for example, the regulating mechanism can also be composed of only the variable side regulating portions 41, 41.

[Technique of the Present Disclosure]

The technique of the present disclosure can also be constituted in the following manner.

(1) A lens barrel including: a lens holding frame holding a lens; a mounting member to which the lens holding frame is mounted; an inclination regulating member regulating a position of the lens holding frame with respect to the mounting member, thereby regulating inclination of the lens holding frame with respect to an optical axis; and an eccentricity regulating member regulating the position of the lens holding frame with respect to the mounting member, thereby regulating eccentricity of the lens holding frame with respect to the optical axis, in which the eccentricity regulating member is supported by the inclination regulating member.

(2) The lens barrel described in the paragraph (1), in which the inclination regulating member is rotatably supported by the mounting member with an axis extending in a radiation direction perpendicular to the optical axis as a fulcrum; and the eccentricity regulating member is rotatably supported by the inclination regulating member with the axis extending in the radiation direction perpendicular to the optical axis as the fulcrum.

(3) The lens barrel described in the paragraph (2), in which the inclination regulating member comes in contact with the lens holding frame in the optical axis direction; and inclination of the lens holding frame with respect to the mounting member is changed by rotation of the inclination regulating member with respect to the mounting member, thereby regulating the inclination of the lens holding frame.

(4) The lens barrel described in the paragraph (2) or (3), in which the eccentricity regulating member comes in contact with the lens holding frame in a radiation direction; and a position of the lens holding frame with respect to the mounting member is changed by rotation of the eccentricity regulating member with respect to the inclination regulating member, thereby regulating the eccentricity of the lens holding frame.

(5) The lens barrel described in the paragraph (4), in which a screw portion is formed in the eccentricity regulating member; and a screw groove portion into which the screw portion is screwed is formed in the inclination regulating member.

(6) The lens barrel described in any of the paragraphs (3) to (5), further including a biasing spring pressing the lens holding frame against the inclination regulating member in the optical axis direction.

(7) The lens barrel described in any of the paragraphs (4) to (6), further including a spring member pressing the lens holding frame against the eccentricity regulating member in the radiation direction.

(8) The lens barrel described in any of the paragraphs (1) to (7), in which the plural inclination regulating members and the plural eccentricity regulating members are provided so as to be made away from each other in a circumference direction.

(9) The lens barrel described in any of the paragraphs (3) to (8), in which an operated portion with which the inclination regulating member comes in contact with the lens holding frame in the optical axis direction may be provided; and the inclination regulating member comes in point-contact with the operated portion.

(10) The lens barrel described in any of the paragraphs (1) to (9), further including a holding member holding the lens holding frame in the mounting member in a phase of the regulation by the inclination regulating member and the eccentricity regulating member.

(11) The lens barrel described in the paragraph (10), in which a coupling hole is formed in the lens holding frame; an abutment portion which is inserted into the coupling hole to abut against a wall surface forming the coupling hole is provided in the holding member; and the abutment portion comes in point-contact with the wall surface.

(12) The lens barrel described in any one of the paragraphs (1) to (11), in which the regulation for the inclination of the lens holding frame with respect to the optical axis, and the regulation for the eccentricity of the lens holding frame with respect to the optical axis are carried out in a telephoto end state.

(13) An image pickup apparatus including: a lens barrel in an inside of which an optical system is disposed; and an image pickup element converting an optical image captured through the optical system into an electrical signal, in which the lens barrel includes: a lens holding frame holding a lens; a mounting member to which the lens holding frame is mounted; an inclination regulating member regulating a position of the lens holding frame with respect to the mounting member, thereby regulating inclination of the lens holding frame with respect to an optical axis; and an eccentricity regulating member regulating the position of the lens holding frame with respect to the mounting member, thereby regulating eccentricity of the lens holding frame with respect to the optical axis, and the eccentricity regulating member is supported by the inclination regulating member.

Any of the concrete shapes and structures of the individual portions shown in the embodiments described above shows only an example of embodiments when the technique of the present disclosure is embodied, and the technical scope of the present disclosure should not be intended to be construed in a limiting sense.

The present technology contains subject matter related to that disclosed in Japanese Priority Patent Application JP 2012-134775 filed in the Japan Patent Office on Jun. 14, 2012, the entire content of which is hereby incorporated by reference.

What is claimed is:

1. A lens barrel, comprising:
a lens holding frame holding a lens;
a mounting member to which said lens holding frame is mounted;
an inclination regulating member regulating a position of said lens holding frame with respect to said mounting member, thereby regulating inclination of said lens holding frame with respect to an optical axis; and
an eccentricity regulating member regulating the position of said lens holding frame with respect to said mounting member, thereby regulating eccentricity of said lens holding frame with respect to said optical axis,
wherein said eccentricity regulating member is supported by said inclination regulating member,
said inclination regulating member is rotatably supported by said mounting member with an axis extending in a radiation direction perpendicular to the optical axis as a fulcrum, and
said eccentricity regulating member is rotatably supported by said inclination regulating member with the axis extending in the radiation direction perpendicular to the optical axis as the fulcrum.

2. The lens barrel according to claim 1,
wherein said inclination regulating member comes in contact with said lens holding frame in the optical axis direction, and
inclination of said lens holding frame with respect to said mounting member is changed by rotation of said inclination regulating member with respect to said mounting member, thereby regulating the inclination of said lens holding frame.

3. The lens barrel according to claim 2, further comprising a biasing spring pressing said lens holding frame against said inclination regulating member in the optical axis direction.

4. The lens barrel according to claim 2, further comprising an operated portion with which said inclination regulating member comes in contact with said lens holding frame in the optical axis direction,
wherein said inclination regulating member comes in point-contact with said operated portion.

5. The lens barrel according to claim 1,
wherein said eccentricity regulating member comes in contact with said lens holding frame in a radiation direction, and
a position of said lens holding frame with respect to said mounting member is changed by rotation of said eccentricity regulating member with respect to said inclination regulating member, thereby regulating the eccentricity of said lens holding frame.

6. The lens barrel according to claim 5,
wherein a screw portion is formed in said eccentricity regulating member, and
a screw groove portion into which said screw portion is screwed is formed in said inclination regulating member.

7. The lens barrel according to claim 5, further comprising a spring member pressing said lens holding frame against said eccentricity regulating member in the radiation direction.

8. The lens barrel according to claim 1,
wherein the plural inclination regulating members and the plural eccentricity regulating members are provided so as to be made away from each other in a circumference direction.

9. The lens barrel according to claim 1, further comprising a holding member holding said lens holding frame in said mounting member in a phase of the regulation by said inclination regulating member and said eccentricity regulating member.

10. The lens barrel according to claim 9,
wherein a coupling hole is formed in said lens holding frame,
an abutment portion which is inserted into said coupling hole to abut against a wall surface forming said coupling hole is provided in said holding member, and
said abutment portion comes in point-contact with said wall surface.

11. The lens barrel according to claim 1, wherein the regulation for the inclination of said lens holding frame with respect to the optical axis, and the regulation for the eccentricity of said lens holding frame with respect to the optical axis are carried out in a telephoto end state.

12. An image pickup apparatus, comprising:
a lens barrel in an inside of which an optical system is disposed; and
an image pickup element converting an optical image captured through the optical system into an electrical signal,
wherein said lens barrel includes:
a lens holding frame holding a lens,
a mounting member to which said lens holding frame is mounted,
an inclination regulating member regulating a position of said lens holding frame with respect to said mounting member, thereby regulating inclination of said lens holding frame with respect to an optical axis, and
an eccentricity regulating member regulating the position of said lens holding frame with respect to said mounting member, thereby regulating eccentricity of said lens holding frame with respect to said optical axis,
wherein said eccentricity regulating member is supported by said inclination regulating member,
said inclination regulating member is rotatably supported by said mounting member with an axis extending in a radiation direction perpendicular to the optical axis as a fulcrum, and
said eccentricity regulating member is rotatably supported by said inclination regulating member with the axis extending in the radiation direction perpendicular to the optical axis as the fulcrum.

13. The image pickup apparatus according to claim 12, wherein said inclination regulating member comes in contact with said lens holding frame in the optical axis direction, and
inclination of said lens holding frame with respect to said mounting member is changed by rotation of said inclination regulating member with respect to said mounting member, thereby regulating the inclination of said lens holding frame.

14. The image pickup apparatus according to claim 13, further comprising
a biasing spring pressing said lens holding frame against said inclination regulating member in the optical axis direction.

15. The image pickup apparatus according to claim 13, further comprising
an operated portion with which said inclination regulating member comes in contact with said lens holding frame in the optical axis direction,
wherein said inclination regulating member comes in point-contact with said operated portion.

16. The image pickup apparatus according to claim 12,
wherein said eccentricity regulating member comes in contact with said lens holding frame in a radiation direction, and
a position of said lens holding frame with respect to said mounting member is changed by rotation of said eccentricity regulating member with respect to said inclination regulating member, thereby regulating the eccentricity of said lens holding frame.

17. The image pickup apparatus according to claim 16,
wherein a screw portion is formed in said eccentricity regulating member, and
a screw groove portion into which said screw portion is screwed is formed in said inclination regulating member.

18. The image pickup apparatus according to claim 16, further comprising
a spring member pressing said lens holding frame against said eccentricity regulating member in the radiation direction.

19. The image pickup apparatus according to claim 12,
wherein the plural inclination regulating members and the plural eccentricity regulating members are provided so as to be made away from each other in a circumference direction.

20. The image pickup apparatus according to claim 12, further comprising
a holding member holding said lens holding frame in said mounting member in a phase of the regulation by said inclination regulating member and said eccentricity regulating member.

21. The image pickup apparatus according to claim 20,
wherein a coupling hole is formed in said lens holding frame,
an abutment portion which is inserted into said coupling hole to abut against a wall surface forming said coupling hole is provided in said holding member, and
said abutment portion comes in point-contact with said wall surface.

22. The image pickup apparatus according to claim 12, wherein the regulation for the inclination of said lens holding frame with respect to the optical axis, and the regulation for the eccentricity of said lens holding frame with respect to the optical axis are carried out in a telephoto end state.

* * * * *